United States Patent [19]
Bergh et al.

[11] Patent Number: 5,713,683
[45] Date of Patent: Feb. 3, 1998

[54] THREE RING BINDER PAGE FOR HOLDING COMPACT DISCS

[75] Inventors: James Allen Bergh, Boulder; Terrence Martin Drew, Superior, both of Colo.

[73] Assignee: Case Logic, Inc., Longmont, Colo.

[21] Appl. No.: 612,116

[22] Filed: Mar. 7, 1996

Related U.S. Application Data

[63] Continuation-in-part of Ser. No. 527,661, Sep. 13, 1995, Pat. No. 5,620,271.

[51] Int. Cl.$^6$ .......................... B42F 13/00; B65D 85/30; B65D 85/57
[52] U.S. Cl. .......................... 402/79; 281/31; 281/38
[58] Field of Search .......................... 402/79, 4, 80 R, 402/80 P; 281/21.1, 15.1, 31, 38, 35, 51, 46, 50; 206/308.1, 309, 307, 313.1, 308.3, 311, 232; 150/39; 428/138, 198; 40/776

[56] References Cited

U.S. PATENT DOCUMENTS

| | | |
|---|---|---|
| D. 261,155 | 10/1981 | Nast . |
| 1,495,953 | 5/1924 | Dick .......................... 281/38 |
| 3,722,564 | 3/1973 | Croon .......................... 150/39 |
| 4,263,357 | 4/1981 | Holson . |
| 4,447,973 | 5/1984 | Wihlke . |
| 4,508,366 | 4/1985 | Brindle . |
| 4,620,630 | 11/1986 | Moss . |
| 4,850,731 | 7/1989 | Youngs . |
| 5,101,973 | 4/1992 | Martinez . |
| 5,396,987 | 3/1995 | Temple et al. . |
| 5,501,540 | 3/1996 | Ho .......................... 402/79 |
| 5,595,797 | 1/1997 | Miller .......................... 281/38 |
| 5,620,271 | 4/1997 | Bergh et al. .......................... 402/79 |

*Primary Examiner*—Andrea L. Pitts
*Assistant Examiner*—G. Andoll
*Attorney, Agent, or Firm*—Earl C. Hancock; Francis A. Sirr; Holland & Hart llp

[57] ABSTRACT

A loose leaf page for selectively storing four compact discs (CDs) on each side of the page, or for storing two CDs and associated printed and graphic information on each side of the page. A flexible, plastic, two-sided, loose leaf page includes four CD storage pockets per side of the page, and includes a hole pattern that facilitates releasably mounting the page in a standard cover-size 1-inch, 1 ½-inch or 3-inch three-ring binder notebook, certain embodiments also facilitating mounting of the page in a three-ring Chicago-posted binder. In order to prevent interference between two CDs that reside closest to the binder rings when a user manually leaves through binder pages, the page includes a six-hole pattern, a three-hole/three-notch pattern, or the page's binder-edge is configured to ensure that the vertical binder-edge, upon the page being turned, moves past the vertical leading edge of the three rings, and then moves backward under the three rings. The CD storage page includes two outer transparent polypropylene layers and an inner layer that is constructed of soft woven or nonwoven polypropylene.

19 Claims, 14 Drawing Sheets

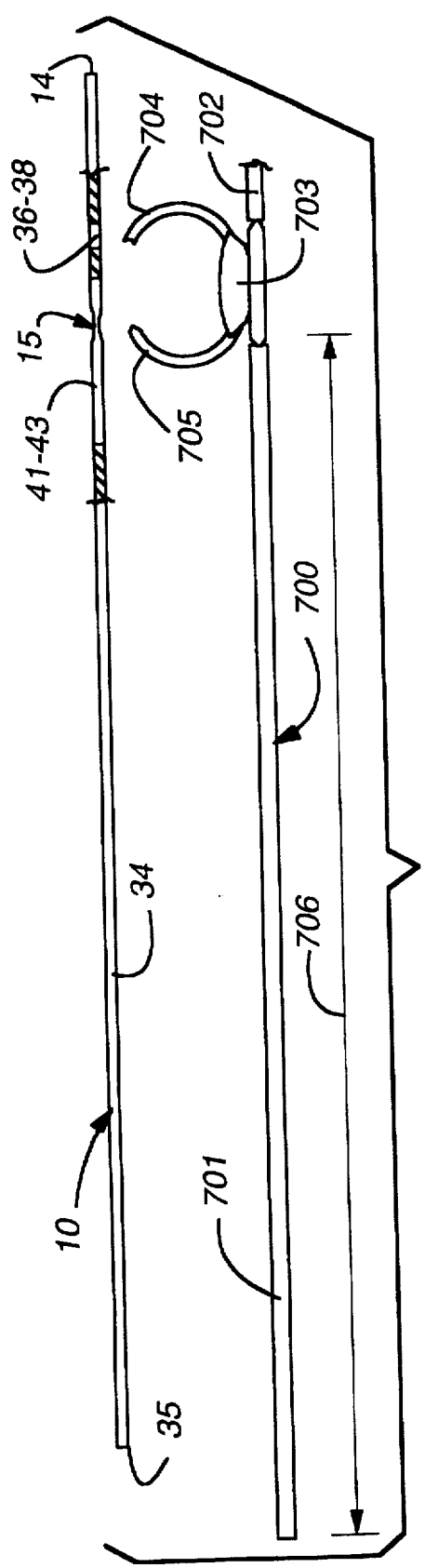
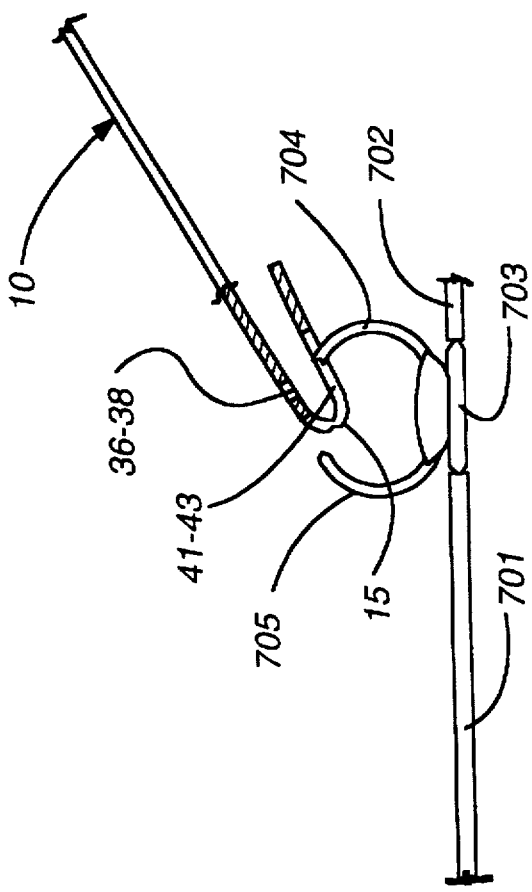
Fig. 7
Fig. 7A

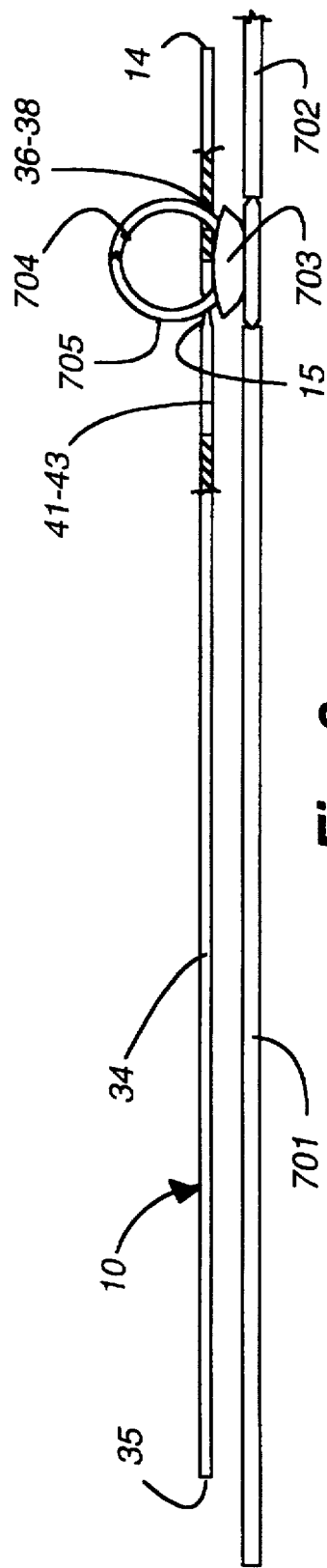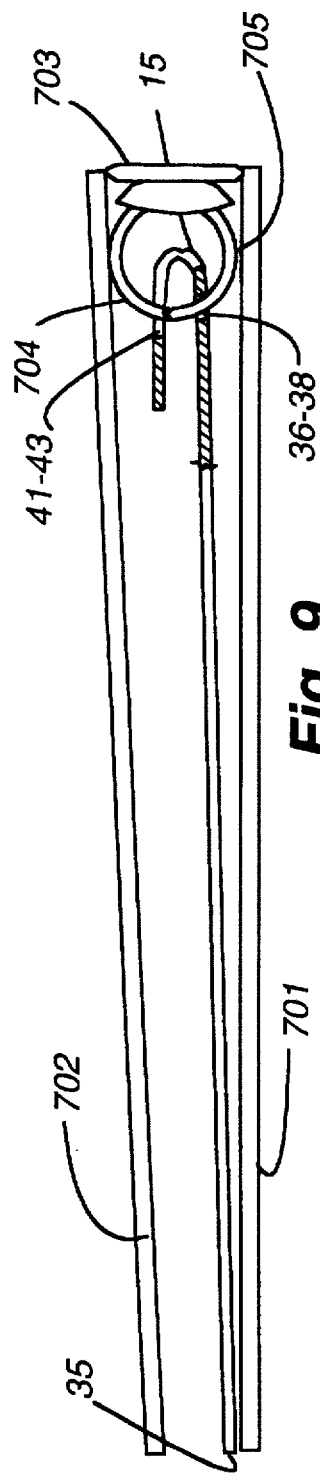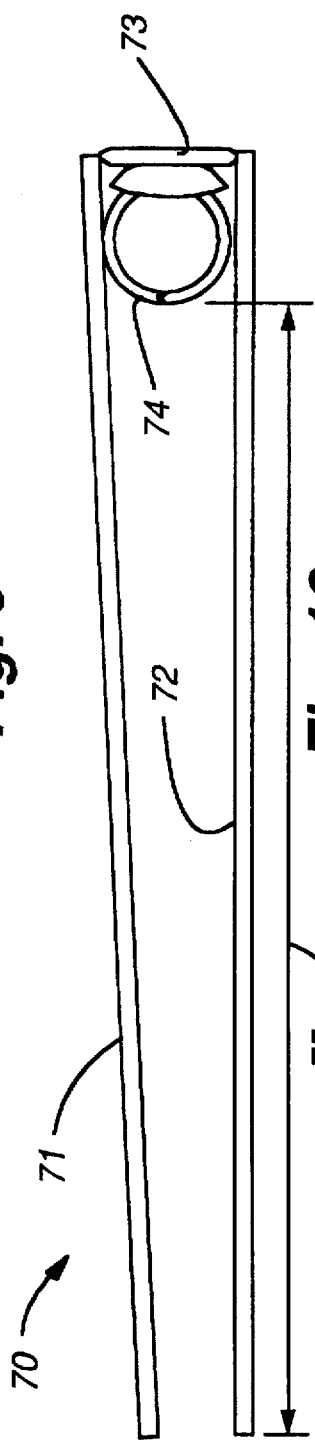

THREE RING BINDER PAGE FOR HOLDING COMPACT DISCS

This application is a continuation in part of patent application Ser. No. 08/527,661, filed Sep. 13, 1995, for THREE RING BINDER PAGE FOR HOLDING COMPACT DISCS now U.S. Pat. No. 5,620,271.

BACKGROUND OF THE INVENTION

1. Field of the Invention

This invention relates to means for efficiently storing compact discs (CDs) in a conventional and well known three-ring binder having standard size covers. More particularly, this invention relates to means for storing a number of compact discs in individual one-disc pockets that are provided on the two opposite sides of a thin, flat, and flexible multi-ply page, so as to facilitate both physical and visual access to eight compact discs, or to four compact discs and printed and graphic information that relates to the four discs.

2. Description of the Related Art

Traditionally, compact discs (CDs) are sold and stored in well-known rigid and relatively thick plastic jewel boxes. Typical jewel boxes include removable printed inserts having one, or more, narrow title bars along at least one narrow edge to thereby permit the owner to find a particular compact disc when a number of the jewel boxes are stacked, or stored, next to each other.

Additionally, jewel boxes typically contain a multi-page insert that lists the songs on the CD and shows a related graphic illustration.

CDs are thin, circular, about 4¾-inch in diameter, and are relatively rugged. The amount of protection that is provided by a jewel box is more than necessary in most circumstances. However, jewel boxes are unnecessarily bulky; thus, limiting the number of CDs that can be carried or stored in any given carrier or cabinet.

As is well known, the construction and arrangement of a CD provides a relative thick and transparent plastic disc. A first side of this plastic disc is exposed to a laser beam for the purpose of reading the CD. The other side of this plastic disc is embossed in order to record a data pattern in a spiral or concentric pattern. This other side of the plastic disc carries a thin disc-shaped metal foil, usually aluminum. In this manner, the laser beam is enabled to read the data, for example music, that is contained on the metal foil side of the plastic disc. The exposed side of the metal foil usually carries text/graphics that is associated with the disc's recorded data. In order to adequately protect such a CD, it is necessary to protect both sides of the disc from scratches and the like. Scratches to the disc's plastic side may provide interference with reflection of the laser beam from the CD's data patterns, whereas scratches to the disc's text/graphics side may remove reflective portions of the metal foil, and thereby render portions of the CD's recorded data difficult to read.

Accordingly, relatively thin sleeves for storing individual CDs have evolved to protect the disc surface from dust, scratching and the like.

The art provides a variety of conventional means for mounting and holding articles in a three-ring binder, as is exemplified by the following patents; Des. 261,155, utility U.S. Pat. Nos. 4,263,357, 4,447,973, 4,508,366 and 4,850,731. In addition, multilayer packaging of disk type articles is known as exemplified by U.S. Pat. Nos. 4,620,630 and 5,101,973.

U.S. Pat. No. 5,396,987 describes a container for a compact disc wherein three thin layers of polypropylene are heat sealed together using line type heat seals, the intermediate one of the three layer being relatively soft.

It is also known in the art to provide a three-ring binder page for the storage of CDs in binders of a nonstandard size. That is, known CD storage pages of this prior type have a planar size that are too large to mount within the covers of a standard size three-ring binder that has multiple and general purpose binding utility. In addition, such known binder pages are constructed and arranged to store, or hold, four CDs on only one side of the page, and the CD storage pockets are provided with a wide and upward facing insertion/removal slot that does not adequately protect the surface of the CD.

FIG. 16 is an end view of a well-known standard size three-ring binder 70 having two covers 71,72 that are hinged on a binder edge 73 that carries three openable metal rings 74. In this figure, the horizontal width dimension 75 that extends from the innermost edge of rings 74 to the outermost edge of covers 71,72 is nominally 9.0-inches, but can vary in the general range of from about 8.5 to 9.5-inches, depending upon the manufacturer of binder 70. Known three-ring binder pages for storing four CDs are too large to fit within dimension 75.

A need remains in the art for a three-ring binder punched page that holds a number of CDs, and perhaps their multi-page illustrative literature, wherein the page's hole pattern facilitates use with a number of different standard three-ring binders of different thicknesses and binder types, wherein the page's binder-edge hole/slot pattern ensures that the pages will not bind as they are turned within the binder, and wherein the page construction requires minimal storage volume, while protecting both surfaces of the CDs from scratches and the like, all in a manner that permits the user to quickly identify and locate a desired CD and/or its related literature.

SUMMARY OF THE INVENTION

This invention provides a flexible, plastic, two-sided, loose leaf page for storing a number of compact discs within a number of one-disc pockets that are contained on the two sides of the page. In this manner, both physical and visual access is provided to eight discs, or physical and visual access is provided to four discs, and printed and graphic information that relates to these four discs.

A preferred embodiment of the invention releasably holds, or stores, four CDs on each side of the flat page or sheet, or if desired, two CDs on each side of the page along with the two liner notes or booklets that relate to each of the two CDs per page side.

A CD storage page in accordance with the invention contains a hole pattern that facilitates releasably mounting the CD storage page in a ½-inch, 1-inch, 1½-inch, 2-inch, or 3-inch thick three-ring binder, or notebook, that has a standard cover size generally associated with a general utility of holding text/graphics pages that have an 8.5 to 9.0 wide (called horizontal herein) by 11 high (called vertical herein) inch size format.

In one embodiment of the invention, the CD storage page includes a binder edge that is foldable. In other embodiments of the invention, the foldable binder edge is eliminated.

The first named embodiment of the invention finds utility when mounting the CD storage pages in narrow three-ring binders; for example, in the ½ and 1-inch three-ring binders. In addition, the mounting hole pattern that is provided in this first embodiment of the invention facilitates mounting the CD storage pages in a Chicago-posted binder.

Standard and well-known three-ring binders 70, shown in FIG. 16, have two external covers 71,72 that measure about 11½-inches high and about 10-inches wide, the height dimension being measured parallel to the binder's linear ring-containing edge 73, and the width dimension being measured perpendicular to the edge 73 that carries the three binder rings 74. As shown in FIG. 16, the horizontal dimension 75 that is available for page storage is nominally 9.0-inches.

Standard size CDs are about 1/16-inch thick and have a diameter of about 4¾-inch. Thus, in order to provide four one-CD pockets per page side, the construction and arrangement of the present invention positions the CD pockets so as to take advantage of the vertical space that exists between the binder's three rings 74 of FIG. 16; i.e., a circumferential edge of a CD resides slightly within a vertical cylinder that is defined by the three closed and vertically aligned binder rings 74.

In addition, and in order to prevent physical interference or obstruction between the two inner CDs that reside closest to the vertically oriented binder rings 74 of FIG. 16 when binder 70 contains multiple pages, and when a user opens binder 70 and then manually leaves through the pages, in one embodiment of the invention, the page contains a six-hole pattern, and in another embodiment of the invention, the page contains a three-hole/three-slot pattern, that ensures that a vertical pivot line on the page being turned will move past the vertical leading edge of the three-binder rings 74, and then backward under the three binder rings 74.

In addition, the construction and arrangement of the page's hole/slot pattern allows the entire page to hinge over the binder's three rings 74 in a manner to accommodate the narrowing circle that is defined by the two mating portions of binder rings 74, as the three-ring binder 74 become generally full of binder pages in accordance with this invention.

When CD storage pages in accordance with the invention are used in a relatively thin ½-inch or 1-inch three-ring binder, the pages of embodiments of the invention containing a foldable hinge flap are nested in pairs, with one page's hinge flap fitting inside the other page's hinge flap. When CD storage pages in accordance with this embodiment of the invention are used in the thicker three-ring binders, all pages install individually, as will be apparent. When CD storage pages in accordance with this embodiment of the invention are used in Chicago-posted binders, the pages lay flat, that is the page's hinge flap is not folded, as will be apparent.

In other embodiments of the invention, the CD storage page is configured without a fold line or a hinge flap, and these pages install in the same manner in all size standard three-ring binders.

In accordance with a preferred embodiment of the invention, each CD storage page was provided with four one-CD storage pockets per page side; i.e., eight pockets per page. The CD storage pockets were arranged in a square matrix comprising two vertical columns and two horizontal rows. Each of the four stored pockets was about 4.843-inches in vertical height and horizontal width. The four CD storage pockets were each provided with a linear and vertically extending CD insertion/removal edge opening of this same vertical height, with the insertion/removal openings facing in a direction away from the binder's three rings 74; i.e., facing toward the vertical open edge of three-ring binder 70.

Each of the four CD storage pockets per page side included a centrally located and circular central finger hole or opening about 1-inch in diameter. A horizontal slot, or slit, about 0.025-inches in vertical height was generally centered in the area of the CD storage pocket, and extended from the pocket's insertion/removal opening to the pocket's finger hole. This horizontal slit diverged, or widened, as it approached the circular finger hole, and met the circular hole as the slit vertically opened to a tear-drop shape that was formed by upper and lower horizontally extending surfaces that were each formed about a ½-inch radius.

In alternate embodiments, the above-described centrally located finger holes were not used. Rather, each of the four CD storage products per page side included a horizontal slot, or slit, about from 0.50 to 0.75-inches in vertical heights. This slot was generally centered in the area of the CD storage product, and extended from the pocket's insertion/removal opening to the general center of the storage product.

In accordance with the invention, many types of CD removal slots may be used, as long as the widest portion of the selected slot configuration does not exceed about 0.75-inch in vertical height.

Since it is contemplated that a standard three-ring binder 70, as shown in FIG. 16, will hold a number of CD storage pages in accordance with the invention, the facing surfaces of these pages will physically engage and rub together as binder 70 is moved, and the like. The above-described configuration of storage pocket finger holes and horizontal slots, or a horizontal slot about 0.75-inch high, provides substantially complete coverage of the facing CD surfaces, thus protecting these facing surfaces from undesirable scratches and the like.

A user removes a CD from its pocket by first inserting a finger into the central opening that is provided in a CD. The user then pulls the CD to the left and out of the pocket's insertion/removal opening, as the user's finger moves along and through the above-described 0.25, 0.50 or 0.75-inch high horizontal slit.

A CD storage page in accordance with an embodiment of the invention, included two outer transparent polypropylene layers and an inner opaque layer that comprised an intermediate adhesive layer, and two outer polypropylene layers that were formed of a soft nonwoven construction. In another embodiment of the invention, the above-described three-layer configuration that comprised (1) outer nonwoven-polypropylene layer, (2) adhesive layer, and (3) outer nonwoven-polypropylene layer was replaced by a single layer of a woven material, such as polypropylene, polyethylene, or a like material.

These and other objects, features and advantages will be apparent to those of skill in the art upon reference to the following detailed description of the invention, which description makes reference to the drawing.

BRIEF DESCRIPTION OF THE DRAWING

FIG. 7 is a side view of an open and standard three-ring binder of the either the 1-inch, 1½-inch or 3-inch three size, wherein the CD storage page of FIG. 1 is shown in an elevated position vertically over the three open binder rings, prior to folding the binder page on its fold line, whereupon the folded binder page may be lowered onto the open binder rings, as is seen in FIG. 7A.

FIG. 8 is a view like FIG. 7 that shows the CD storage page of FIG. 1 lowered onto the three binder rings, and with the binder rings closed.

FIG. 9 is a view like FIG. 8 that shows the CD storage page in its folded state, such that the three-ring binder can be closed, as shown in FIG. 9.

FIG. 16 is an end view of a well-known standard size three-ring binder having two covers that are hinged on a binder edge that carries three openable metal rings.

DESCRIPTION OF THE PREFERRED EMBODIMENTS

Figure 1A:
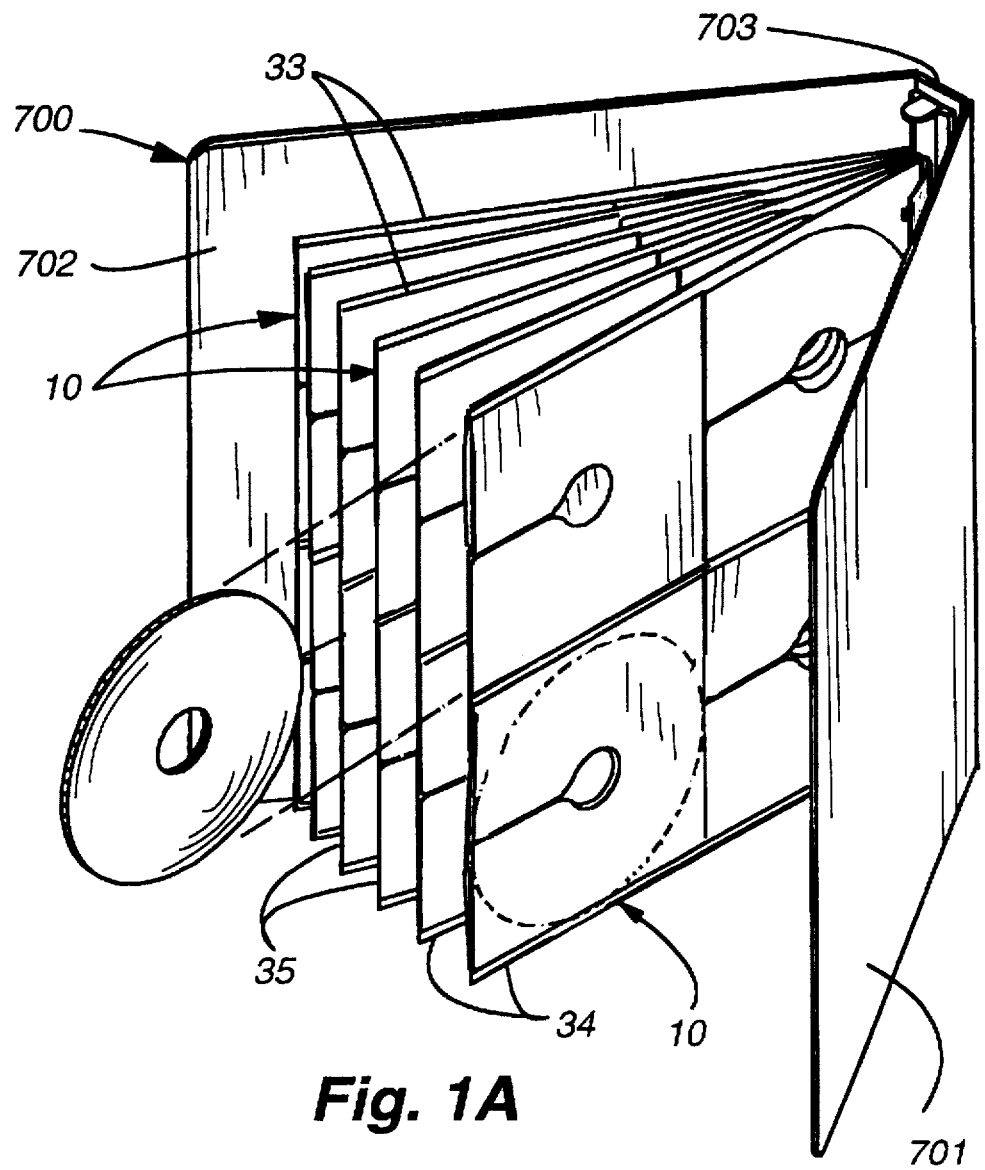
FIG. 1, consisting of FIG. 1A and FIG. 1B, is a plan view of a loose leaf, two-sided, CD storage page in accordance with the invention, this page being usable to store a number of compact discs (CDs) within a thin, flexible, multi-ply page, so as to provide physical and visual access to eight CDs, wherein four CDs are held on each side of the page, or to provide physical and visual access to four CDs and the printed/graphic information that relates to the four CDs, in which case, two CDs and their printed/graphic information are held on each side of the page, the opposite side plan view of the page being a mirror image of FIG. 1A.

FIG. 1A is a plan view of a rectangular shaped, loose leaf, two-sided, CD storage page 10 in accordance with the invention. As will be apparent, page 10 is foldable, and is usable to store a maximum of eight CDs within the four CD storage pockets that are provided on each side of page 10. Another utility of page 10 is to store two CDs on each side of the page, in which case, the printed/graphic information relating to a CD can also be stored on the same side of page 10 as its related CD. While FIG. 1A shows only one side of a CD storage page 10 in accordance with the invention, the other side of page 10 is a mirror image thereof.

Figure 1B:
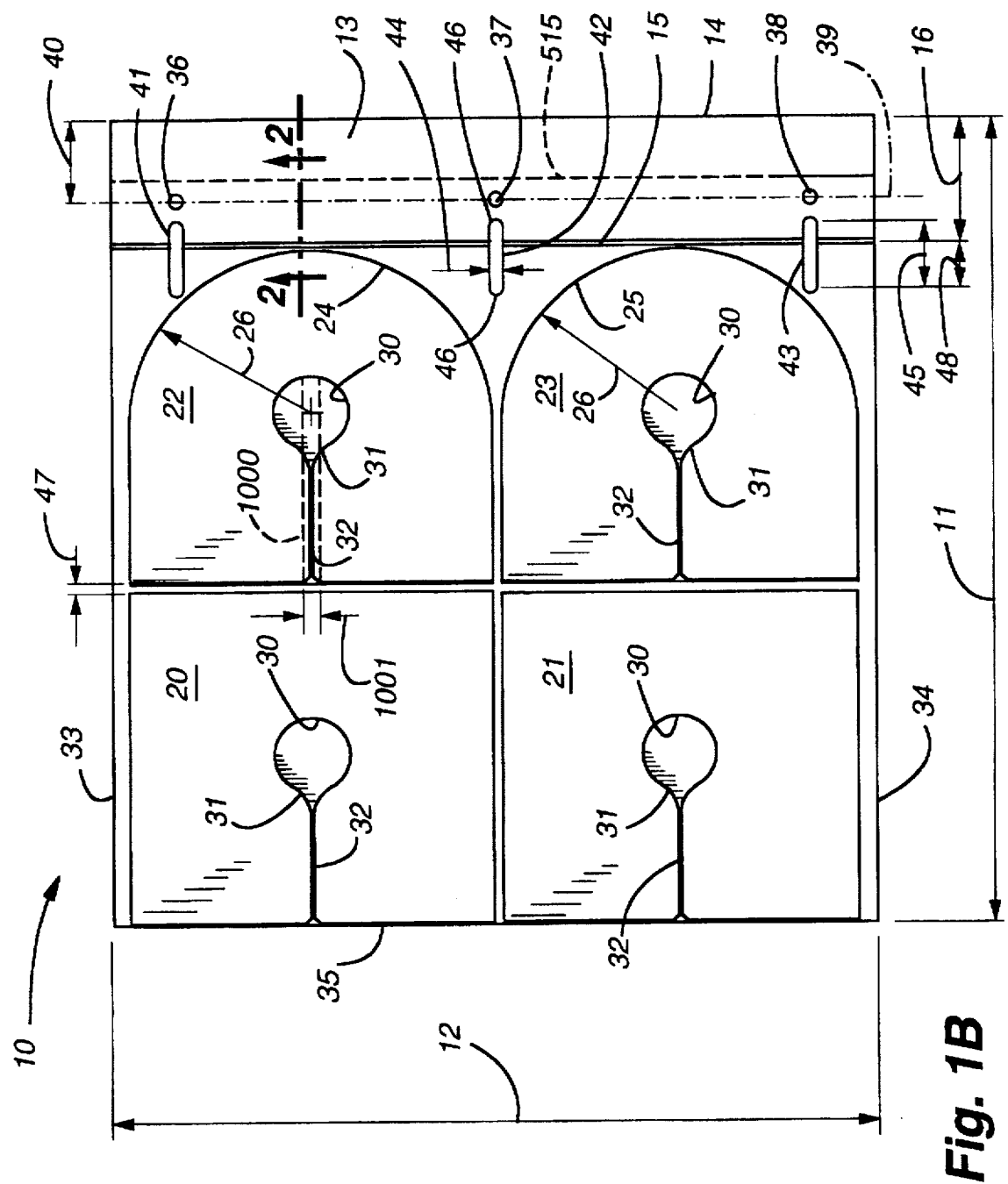

In an embodiment of the invention shown in FIGS. 1A and 1B, the flat or unfolded horizontal width 11 of rectangular page 10 was about 11.336-inches, and the vertical height 12 of page 10 was about 10.25-inches. Page 10 includes a foldable mounting, or hinge flap 13, that is defined by vertically extending right hand page edge 14 and a vertically extending and deep heat seal fold line 15 that extends generally parallel to page edge 14. In an embodiment of the invention, the horizontal width 16 of flap 13 was about 1.75-inch.

Heat seal line 15 is characterized as a deep heat seal line in that the formation of heat seal line 15 compresses the multiple sheets that make up page 10 so that the page thickness along fold line 15 is about 0.0011-inch, thus providing less page thickness along fold line 15 then exists along the page's other heat seal lines that will be described.

Page 10 includes a horizontally extending upper edge 33, and a horizontally extending lower page edge 34 that is parallel to edge 33. As will be apparent, page edges 33,34 are defined by two horizontally extending and parallel heat seal lines. In an embodiment of the invention, the page's vertically extending left hand edge 35, that extends generally parallel to both fold line 15 and right hand page edge 14, was not heat sealed.

Each flat and generally planar side of page 10 includes four one-CD storage pockets 20, 21, 22, and 23 that are arranged in a square matrix comprising two horizontal pocket rows 20,22 and 21,23, and two vertical pocket columns 20,21 and 22,23. The following dimensions are a nonlimiting example of an embodiment of the invention. The two outer CD storage pockets 20,21 are of a square shape, about 4¾-inch on each side. The two inner, or binder side CD storage pockets 22,23, also occupy a generally 4¾-inch by 4¾-inch area. However, the binder side of each of the two inner pockets 22,23 comprises a semicircular portion 24,25 that is formed with a radius 26 of about 2⅛-inch. As will be apparent, the bounds of CD storage pockets 20-23 are defined by heat seal lines that are used to seal the multiple plies of page 10 together.

Numeral 47 identifies a common horizontal spacing that is provided between the two upper CD storage pockets 22 and 20, and between the two lower CD storage pockets 21,23, distance 47 being about 0.063-inch in an embodiment of the invention.

Each of the four CD pockets 20-23 that exist on each side of page 10 includes a centrally disposed and circular finger opening 30 that is about 1-inch in diameter. The left hand side of each opening 30 is formed to have a tear-drop shape extension 31 having two sides that are formed about a 0.5-inch radius. The left hand side of each of the four tear-drop extensions 31 terminates at a thin horizontally extending slot 32 that is about 0.025-inches in vertical height. Preferably, slots 32 extend parallel to horizontal page edges 33,34.

The intended utility of a CD storage page 10 in accordance with the invention is that the CD's clear plastic beam-receiving surface be placed so as to face inward, and that the CD's text/graphics surface face outward. As is apparent, the use of the above-described small-size finger opening and horizontal slot construction and arrangement in accordance with the invention minimizes the likelihood that either side of a CD contained within a storage pocket can be physically damaged as by scratching, or the like, especially when multiple CD storage pages 10 in accordance with the invention are loaded into a standard size three-ring binder.

While use of this small-size finger opening 30 and horizontal slot 32 is of adequate utility, it is to be understood that within the spirit and scope of this invention, opening 30 and slot 32 can be replaced by any similar shape, and in an embodiment of the invention, the FIG. 1B shape 30,32 was replaced by a slot 1000 having a uniform vertical height 1001 that did not exceed about 0.50-inch.

The right hand binder portion of CD storage page 10 includes three circular through-holes 36,37,38 that are each about 0.1875-inch in diameter. Circular holes 36-38 lie on a common vertical axis 39 that extends generally parallel to page edge 14, and is offset a distance 40 from page edge 14. In an embodiment of the invention, distance 40 was about 1.125-inches. Binder hole 37 is generally centered on the vertical height of page 10, and in an embodiment of the invention, holes 36 and 38 were offset a distance of about 0.84375-inch inward from the page's upper and lower edges 33,34, respectively. In this embodiment of the invention, central hole 37 was spaced a distance of about 4.250 to about 4.281-inch from each of the two holes 36 and 38.

The right hand portion of page 10 also includes three horizontally extending and elongated through-holes 41,42, 43. The three elongated holes or slots 41-43 are each about 0.1875-inch in vertical height 44, and are each about 0.875-inch in horizontal length 45, wherein the horizontal length of elongated holes 41-43 is measured from center to center of the two terminal radius. The two horizontal ends 46 of each elongated hole 41-43 preferably terminate two radius surfaces; for example, surfaces having a radius of about 0.09375-inch. As can be seen from FIG. 1B, each of the three elongated holes 41-43 is in horizontal alignment with an individual one of the three circular holes 36-38. Elongated holes 41-43 are also vertically aligned so that each of the holes 41-43 is equally horizontally spaced from circular holes 36-38, and from the page's right hand edge 14.

A feature of the invention provides that elongated holes 41-43 are positioned so that the center of the radius that is located at the left hand end 46 of each hole is located a distance 48 that is about 0.625-inch to the left of fold line 15.

As will be apparent, when CD storage page 10 is folded along fold line 15, each of the three circular holes 36-37 is brought into general alignment with the left hand end of an elongated hole or slot 41-43. In this aligned position, each hole/slot combination is in a position to be lowered onto the left hand one of a pair of mating ring portions that comprise an open binder ring. For example, FIG. 7A shows a page 10 in the above-described aligned position wherein each hole/ slot combination is in a position to be lowered onto right hand one 704 of a pair of mating ring portions 704,705 that comprise an open binder ring.

Figure 2:
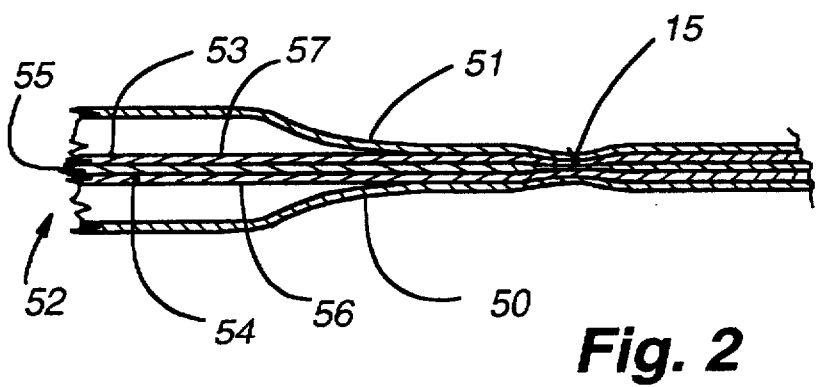
FIG. 2 is an enlarged section view of a portion of a multi-ply CD storage page in accordance with the invention, this figure being useful in explaining the page's multiple ply construction and arrangement.

FIG. 2 is an exploded and enlarged sectional view, of a portion of a multi-ply CD storage page in accordance with the invention, this figure being useful in explaining the multiple ply construction and arrangement of storage pages 10 in accordance with the invention.

As is apparent from FIGS. 1A and 1B, the two outer plies 50,51 of CD storage page 10 are substantially identical in form and construction, and each of these two outer plies 50,51 contains four circular finger holes 30 through which the two opposite planar surfaces 56 and 57 of a middle ply 52 can be viewed.

More specifically, and with reference to FIG. 2, each of the outer plies 50,51 is preferably formed of a thin extruded film or sheet of transparent polypropylene that is about 0.00055-inch thick, preferably having a matte finish. Inner ply 52 is formed, extruded, or laminated to form a thin, three-member, unitary ply 52 having an extrudate adhesive layer or member 55, and having two outer layers or members 53,54 that each comprise an opaque, nonwoven, and relatively soft polypropylene layer; for example, the Stearns brand nonwoven polypropylene having a weight of about 30 grams per square yard. As will be appreciated by those of skill in the art, the formation of inner ply 52 provides a unitary assembly having the three layers 53,55,54. In an embodiment of the invention, adhesive layer 55 was about 0.000125-inch thick, whereas outer layers 53,54 were each about 0.00055-inch thick. Layers 53,54 that are formed of nonwoven polypropylene have the visual appearance of a soft quilted surface.

The intent and purpose of CD storage page 10 is that the CDs that are stored therein reside in pockets 20-23 with their text/graphics side visible through transparent layers 50,51, and with their opposite and clear plastic sides in physical contact with soft surfaces 56,57 of inner ply 52.

Surfaces 56,57 are soft and protective of the clear plastic disc surfaces through which a laser beam reads the CD, whereas layers 50,51 have finger openings and slots that are of minimum area so as to maximize the protection that is afford to the text/graphics sides of the CDs, this side of the CD carrying a thin and reflective aluminum layer whose outer surface carries the CD's text/graphics material, and whose inner surface provides for reflection of a reading laser beam.

Figure 3:
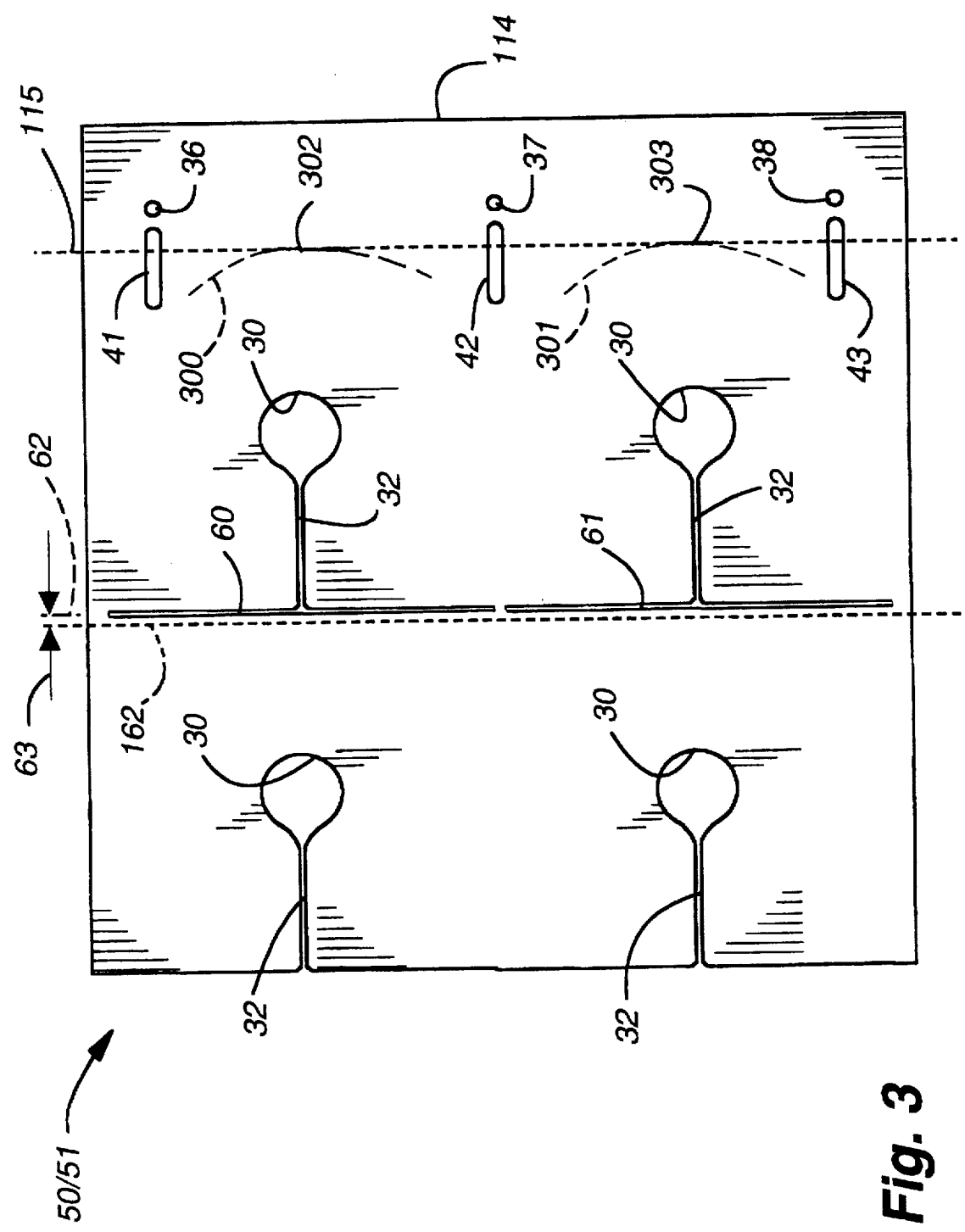
FIG. 3 is a plan view similar to FIG. 1A showing one embodiment of the two transparent outer sheets that are included in the binder page of FIG. 1, and showing the cut line pattern that is formed in each of the two outer sheets of the binder page.

FIG. 3 is a plan view similar to FIG. 1 showing one embodiment of the two rectangular and transparent outer sheets 50,51 that comprise portions of the CD storage page of FIG. 1. In FIG. 3, the two outer sheets 50,51 are each formed from a single sheet, whereas in FIG. 4, another embodiment will be described wherein the two transparent outer sheets 50,51 are each formed from as a two member assembly.

FIG. 3 shows the cut line pattern that is formed in each of the two outer sheets 50,51, and shows by means of a dotted line 115 the position of FIG. 1's heat seal deep fold line 15. Through holes 36–38 and 41–43 are punched, or cut, into each of the outer sheets 50,51, as are tear drop shaped finger openings 30 and slots 32. In an embodiment of the invention, the above-mentioned through holes were punched in a fully assembled CD storage page; i.e., after the three page members 50,51,52 were heat sealed together.

In addition, linear or straight cuts 60,61 are formed in each of the outer sheets 50,51 to form the insertion/removal openings for CD storage pockets 22,23, respectively. Cuts 60,61 are aligned on an axis 62. In addition, cuts 60,61 are centered on slots 32, extend substantially parallel to dotted line 115 and to the right hand edge 114 of the sheet, and cuts 60,61 are each about 4.843-inches long.

Dotted lines 300,301 show the position that the right hand peripheral edge of two CDs that are stored in storage pockets 22,23, respectively. These two CDs occupy a position relative to fold line 15, as represented by numeral 115. As a feature of the invention, inner and outer sheets 50,51 may be provided with short linear cuts 302,303 that are located generally coincident with dotted line 115 and parallel to edge 114. Cuts 302,303 operate to accommodate movement of the right hand edge of the CDs that are stored in pockets 22,23, respectively. As will be apparent relative to the embodiment of the invention shown in FIG. 13, cuts 302, 303, and the function that is provided thereby, can also be provided by the use of like-positioned through holes.

In another embodiment of the invention, sheets 50,51,52 are formed from three moving webs 50,51,52, wherein the CD insertion/removal openings 30 and slits 32 are first made in the two moving sheet webs 50,51 prior to heat sealing the three moving webs into a moving web assembly, whereupon the page's through holes 36–38 and 41–43 are punched in the now-sealed-together assembly of three moving webs 50,51,52.

Figure 4:
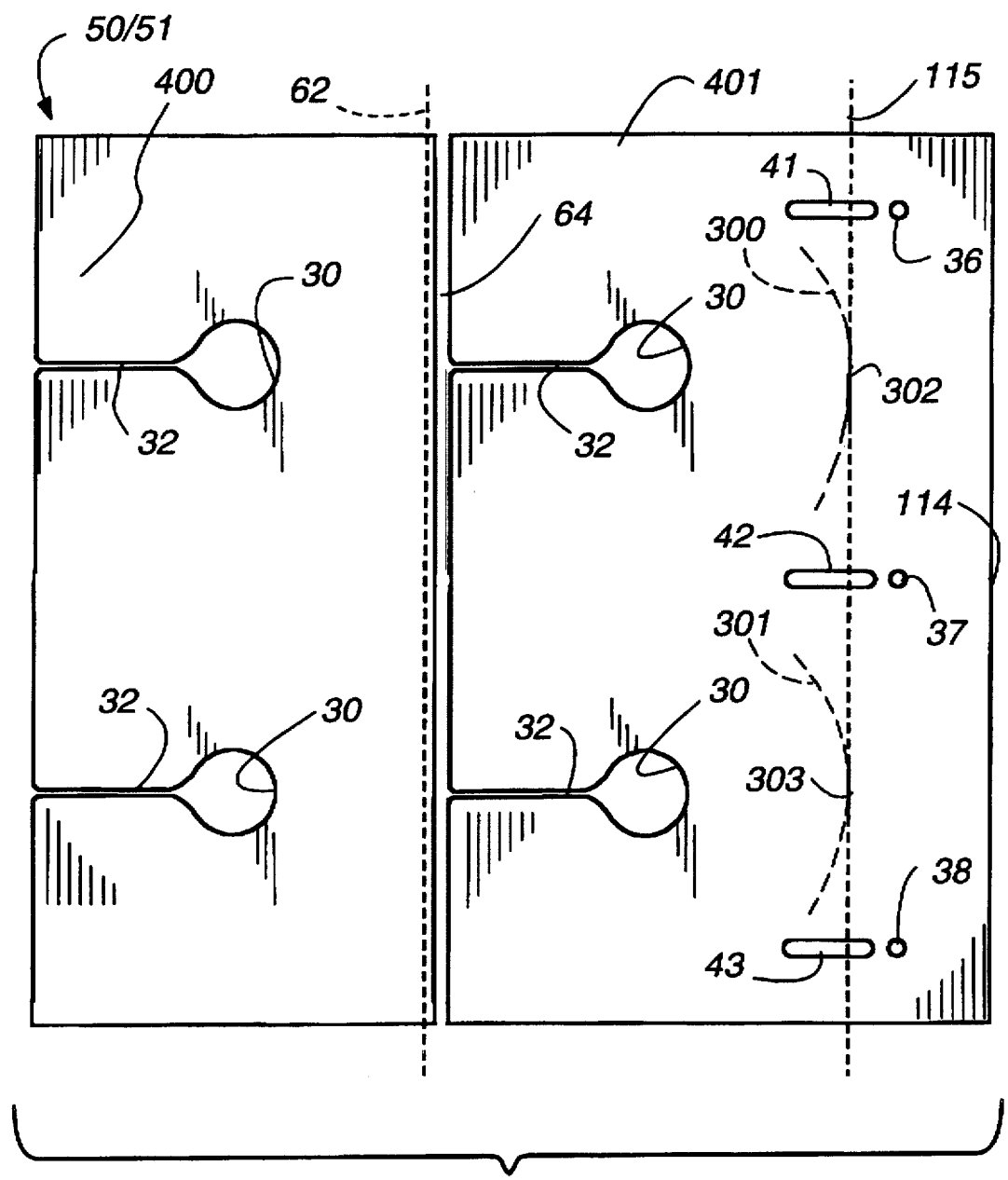
FIG. 4 is a plan view similar to FIG. 3 showing another embodiment of the two transparent outer sheets that comprise the page of FIG. 1, wherein each of the two outer sheets is formed from a two member assembly.

FIG. 4 is a plan view similar to FIG. 3 that shows another embodiment of the two rectangular and transparent outer sheets 50,51 that comprise the exterior layers of storage page 10 of FIG. 1. In this embodiment of the invention, each of the two outer layers or sheets 50,51 is formed as a two-member, or two web, assembly 400,401.

With reference to FIGS. 1, 2 and 3, and as will be apparent from a following description of the heat seal procedure for CD storage page 10, a heat seal line pattern operates to bind the three members 50,51,52 of FIG. 2 together in order to form the unitary assembly of a CD storage page 10 in accordance with FIG. 1.

In the single sheet or web embodiment of outer sheets 50,51 that is shown in FIG. 3, a linear heat seal line is positioned closely to the left of vertical CD insertion/removal axis 62; for example, at axis 162. In this FIG. 3 embodiment of the invention, the horizontal distance 63 between axes 62 and 162 was about 0.063-inches.

In the two-member or two-web embodiment of outer sheets 50,51 that is shown in FIG. 4, each outer sheet 50,51 comprises a first sheet member, or web 400, and a second sheet member or web 401. While the two sheet members 400,401 function as a single member, as was described above relative to FIG. 3, they are separated by a small linear gap 64. Gap 64 performs the disc-insertion/disc-removal function that cuts 60,61 of FIG. 3 perform for CD storage pockets 22,23. In FIG. 4, heat seal line 62 remains in the same physical page position, as is shown in FIG. 3, but sheet member or web 401 is of slightly reduced horizontal width so as to provide for the presence of a vertically CD insertion/removal slot at the left hand side of each of the inner CD storage pockets 22,23.

This reduction in horizontal width of sheet member 401 results in somewhat less critical manufacturing tolerance in the placement of a heat seal line 62 during the heat seal manufacturing step, and also provides each of the two inner CD storage pockets with a vertically extending CD insertion/removal slot.

Figure 5:
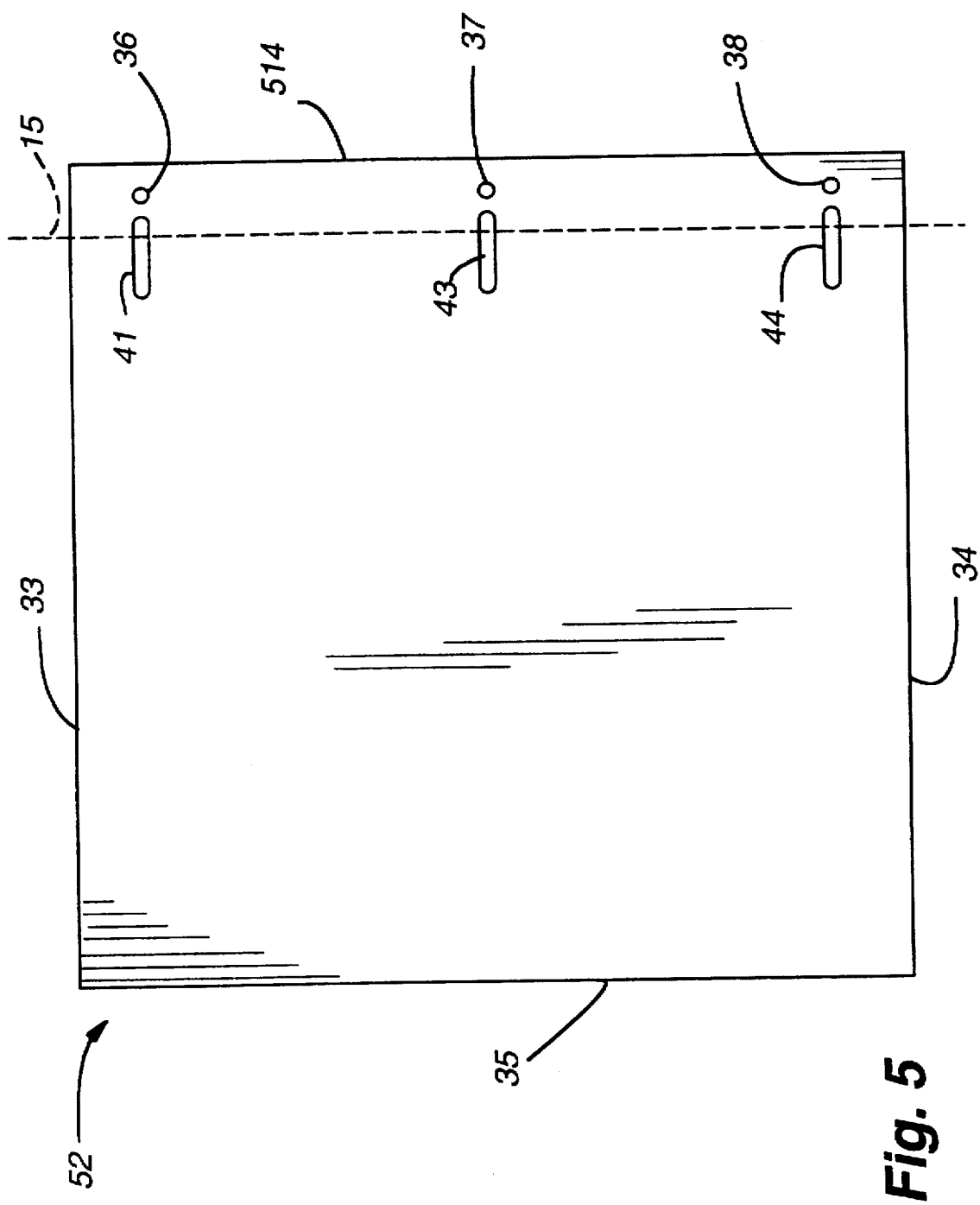
FIG. 5 is a plan view similar to FIG. 1B showing the three-ply opaque middle sheet of the invention, and showing the three-ring binder openings that are formed in this middle sheet.

FIG. 5 is a plan view similar to FIGS. 1, 3, and 4 that shows the three-ply opaque and rectangular shaped middle sheet 52 of CD storage page 10 that is shown in the plan view of FIG. 1. As can be seen from this figure, middle sheet 52 contains only the six binder openings or through holes 36–38 and 41–43. As noted above, it may be desirable to punch these six binder openings 36–38 and 41–43 after the binder page has been assembled into a unitary assembly by operation of a heat sealing process.

In an embodiment of the invention, middle sheet 52 was somewhat smaller in the horizontal dimension than were outer sheets 50,51. As a result, the upper and lower edges 33,34, as well as the left hand edge 35 of middle sheet 52, were located coincident with the similar numbered edges of FIG. 1's CD storage page 10. However, the right hand edge 514 of middle sheet 52 was located at about the location of axis 515 shown in FIG. 1 that is just to the right of circular binder holes 36–38.

Figure 6:
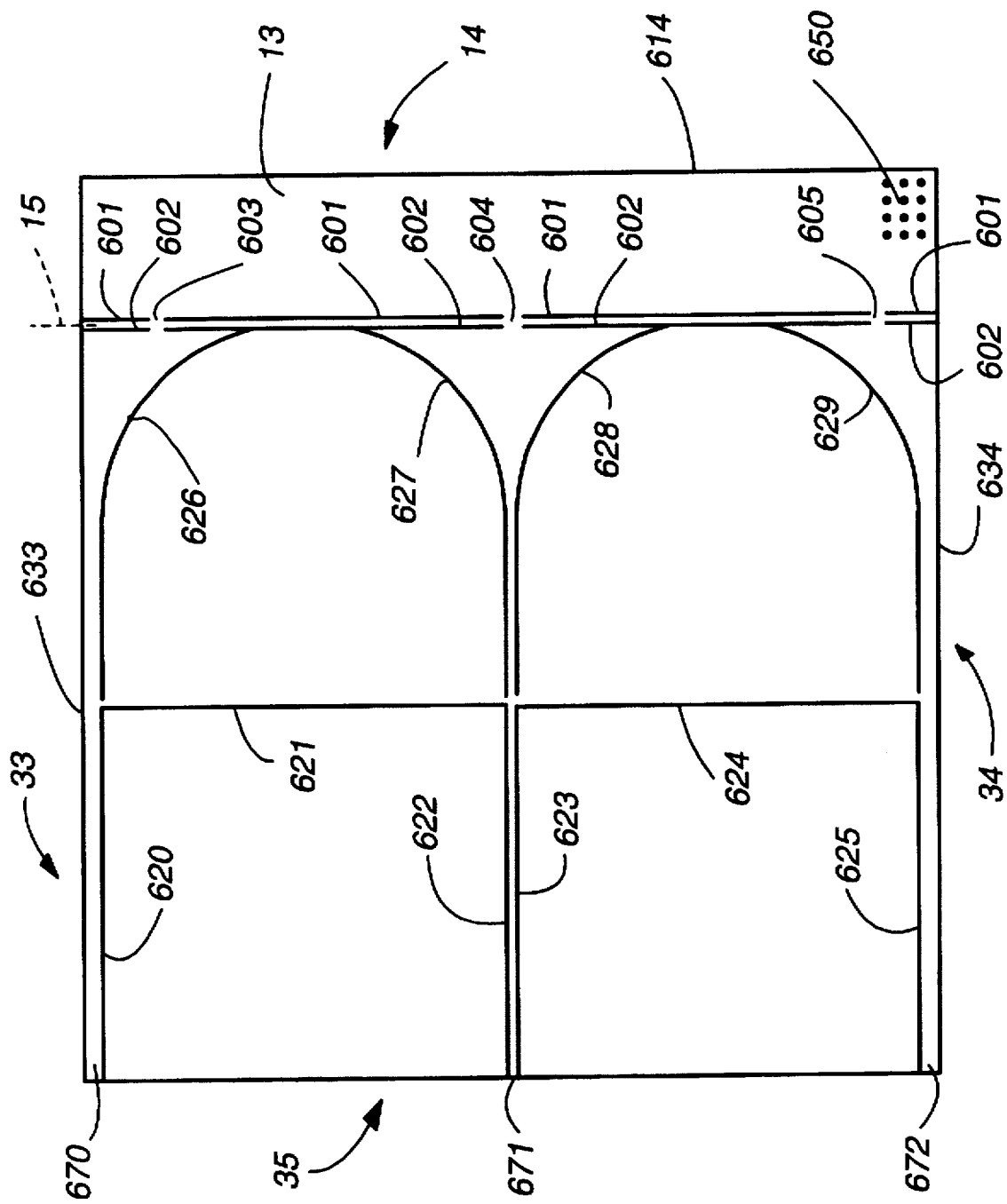
FIG. 6 is a plan view similar to FIG. 1B showing the line-type, double bar, heat sealing pattern that is used to bind two outer sheets, as shown in FIG. 3, and one middle sheet, as shown in FIG. 5, into the unitary page assembly shown in FIG. 1, this figure also showing how a fold line is formed in the resulting page by operation of a deep heat seal line.

FIG. 6 is a plan view similar to FIG. 1 that shows a line-type heat sealing pattern that is used to bind two outer sheets 50,51 of FIGS. 2, 3 and 4, and one middle sheet 52 of FIGS. 2 and 5 into the unitary CD storage page assembly 10 that is shown in FIG. 1. FIG. 6 also shows how the page's deep fold line 15 is formed in the resulting page 10 by operation of a double heat seal line 601,602. For the purpose of orienting FIG. 6 to FIG. 1, the four orthogonal edges 14,33,35,34 of CD storage page 10 are shown in FIG. 6.

The specific manufacturing process for performing the heat sealing of two outer sheets 50,51 and a single middle sheet 52 into a unitary page assembly 10 is not critical to the invention. Since this manufacturing procedure is well known to those of skill in the art, it will not be described in detail herein.

As a first step in the assembly of the three FIG. 2 page members 50,52,51 into the unitary CD storage page assembly 10 that is shown in FIG. 1, the three page members 50,52,51 are brought into rectangular alignment. For example, three running webs, one outer web containing outer sheets 50, an inner web containing middle sheets 52, and a second outer web containing outer sheets 51 are brought into running alignment. With the three page members 50,52,51 accurately held in this aligned position, heat seals are now used to seal the three members together into a unitary page assembly 10. Thereafter, and while in web form, the above-described through holes 36–38 and 41–43 are accurately punched in each individual CD storage page 10 that is within the web.

The outer page edges 14,33,34 are each provided with a heat seal line 614,633 that is located generally coincident with page edges 14,33,34, respectively.

In addition, fold line 15 is formed by a pair of deep and closely spaced and linear heat seal lines 601,602 that are individually spaced on opposite sides of fold line 15, and individually extend generally parallel to heat seal line 614 and page edge 14. As shown, gaps 603,604,605 accommodate the location of elongated holes 41,42,43 within page 10.

CD storage pockets 20,21 are formed by, and bounded by, linear heat lines 620,621,622 and 623,624,625, respectively, whereas CD storage pockets 22,23 are formed by, and bounded by, linear/circular heat seal lines 626,627 and 628,629, respectively.

While the left hand page edge 35 may not include a heat seal pattern, if desired, three linear heat seal lines 670,671, 672 may be provided generally coincident with the portions of page edge 35 that do not form the disc insertion/removal portion of CD storage pockets 20,21.

As a feature of the invention, the page area that is occupied by flap 13 of page 10, which is also identified by numeral 13 in FIG. 6, may be provided with a heat seal pattern (for example, a pattern of dots or a cross hatch pattern as is indicated at 650) in order to secure the three page members 50,52,51 together in a selected portion of, or in the entire area of, flap 13. In addition, it is within the spirit and scope of the invention to use such a heat seal pattern in other non-CD-storage areas of page 10.

It should be understood that heat seal lines 621,624 are located to the left of cuts 60,61 (see FIG. 3) that are formed in outer sheets 50,51. Thus, access to the two CD storage pockets 22,23 (see FIG. 1) that are on the two sides of CD storage sheet 10 is not obstructed.

As stated previously, in the FIG. 4 embodiment of the invention wherein the two rectangular and transparent outer sheets 50,51 that comprise the two exterior layers of storage page 10 are each formed as a two web, assembly heat seal lines 621 and 624 remain in the same physical page position as is shown in FIG. 6, but the web from which inner CD storage pockets 22,23 are formed is of slightly reduced horizontal width, so as to provide for the presence of a vertically CD insertion/removal slot at the left hand side of each of the inner CD storage pockets 22,23, and to the right of heat seal line 621,624. This reduction in horizontal width of this sheet web results in somewhat less critical manufacturing tolerance in the placement of heat seal line 621,624 during the FIG. 6 heat seal manufacturing step, while at the same time providing each of the two inner CD storage pockets 22,23 with the required vertically extending CD insertion/removal slot.

A new and unusual feature of this invention is the manner in which the three circular holes 36–38, the three elongated holes 41–43, and the linear fold line 15 of a CD storage page 10, in accordance with this invention, cooperate with a standard three-ring binder to facilitate mounting of the generally 10.25-inch (vertical) by 11.366-inch (horizontal) CD storage page 10 in a standard three-ring binder whose corresponding size profile, when closed, is about 11.5-inches by 10.5-inches.

FIG. 7 is a side view of the horizontal edge of an open and standard size three-ring binder 700, wherein one CD storage page 10 in accordance with FIG. 1 is positioned, or located, in an elevated vertical position directly over the three open binder ring mating pair 704,705. In FIG. 7, dimension 706 is about 10.5-inches.

FIG. 7 shows the two binder covers 701,702 in the well-known open and flat position, with centrally located binder portion or edge 703 being exposed. CD storage page 10 is located so that its three circular holes 36–38 are in vertical alignment with the right hand portions 704 of the three binder rings, and with the page's three elongated holes 41–43 in vertical alignment with the left hand portions 705 of the three binder rings. As can be seen, the page's fold line 15 is now positioned intermediate binder portions 704,705, page 10 not being folded on its fold line 15 in this figure.

FIG. 8 is a view similar to FIG. 7 that shows CD storage page 10 lowered onto the three binder rings 704,750, with binder rings 704,705 then being manually closed in the well-known manner, but prior to the folding of CD storage page 10 on its fold line 15, and prior to closing binder covers 701,702. As shown in this figure, the page's fold line 15 is now encircled by the three closed binder rings 704,705, the three circular holes 36–38 of page 10 contain or accommodate the three ring portions 704, and the three elongated holes 41–43 of page 10 contain or accommodate the three-ring portions 705.

In practice, and as shown in FIG. 9, binder page 10 is first folded on its fold line 15, whereupon the left hand end of elongated openings 41–43 are brought into alignment with circular openings 36–38. Folded binder page 10 is then lowered onto open three-ring binder member 705, and the rings 704,705 are then closed. This operation is shown in FIG. 7A.

FIG. 9 is a view similar to FIG. 8 that shows CD storage page 10 after it has been folded along its fold line 15, whereupon the three-ring binders 704,705 are closed, and the binder covers 701,702 are thereafter closed, as shown. Note that page 10 can be folded upward, as is shown in FIG. 9, or the page can be folded downward, as is desired by the user.

This folding of page 10 on its fold line 15 is enabled by virtue of the page movement that is provided by the page's three elongated holes 41–43. As a result of this page movement within binders 701,702,703, the page's fold line 15 moves toward binder portion 703, and this movement operates to pull the page's left hand edge 35 to the right, to a position that is within the confines of closed binder covers 701,702.

Figure 10:
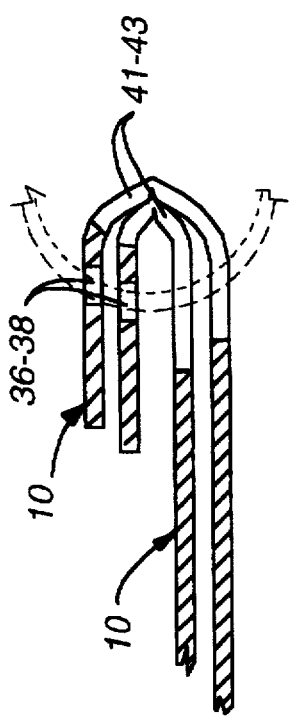
FIG. 10 is an enlarged view of the binder side of two CD storage pages of FIG. 1 showing how the two storage pages are nested together and folded as a unit to accommodate mounting in a standard size ½-inch or a 1-inch thick three ring binder.

FIG. 10 is an enlarged view of the binder side of two CD storage pages 10 of FIG. 1, showing how the two storage pages are nested together, and folded as a unit to accommodate mounting in a ½ or a 1-inch size or thickness three-ring binder.

Figure 11:
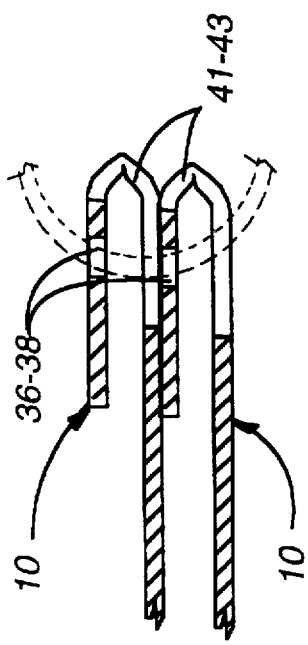
FIG. 11 is an enlarged view similar to FIG. 10 that shows the binder side of two CD storage pages of FIG. 1, showing how the two storage pages are placed one on top of the other and individually folded to accommodate mounting in a standard size 1½-inch, 2-inch, or a 3-inch thick three-ring binder.

FIG. 11 is an enlarged view similar to FIG. 10 that shows the binder side of two CD storage pages 10 of FIG. 1, showing how the two storage pages are placed one on top of the other, and individually folded to accommodate mounting in the larger size or thickness three-ring binders.

Figure 12:
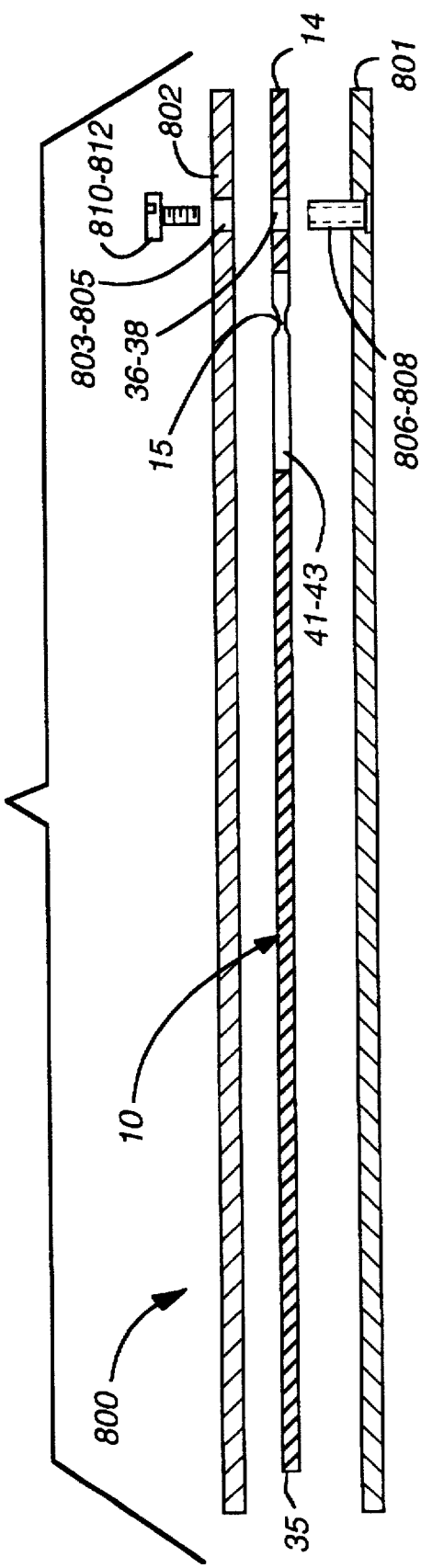
FIG. 12 is a side view similar to FIGS. 8 and 9 that shows how a CD storage page in accordance with the FIG. 1 embodiment mounts in a Chicago-posted binder without the need to fold the CD storage page.

FIG. 12 is a side view similar to FIGS. 8 and 9 that shows how a CD storage page 10 in accordance with FIG. 1 utilizes its three circular holes 36–38 to mount page 10 on the three upstanding posts 806–809 of a well-known Chicago-posted binder 800, without the need to fold CD storage page 10. In this utility of the invention, binder posts 806–809 are fixed to lower binder cover 801, and once a number of pages 10 have been mounted on posts 806–809, the binder's top cover 802, having three holes 803,805 located therein, is lower unto posts 806–809, whereupon cover 802 is secured by operation of three threaded fasteners 810–812. Note that in this utility of the invention, CD storage page 10 need not be folded along its fold line 15, since the covers 801,802 of Chicago-posted binder 800 are large enough to accommodate the 10.25-inch (vertical) by 11.366-inch (horizontal) size profile of CD storage page 10.

Figure 13:
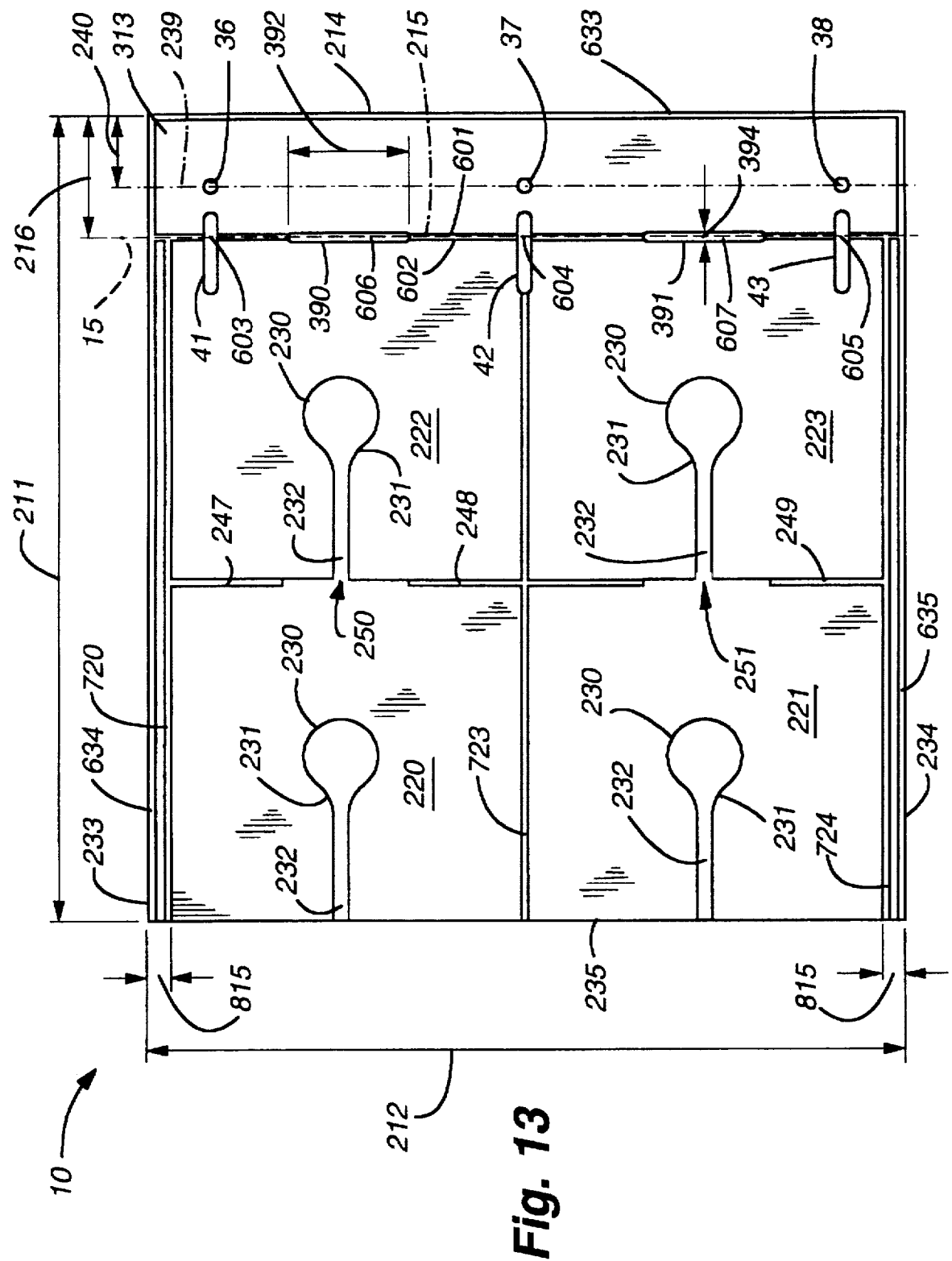
FIG. 13 is a plan view of another folding embodiment of a loose leaf, two-sided, CD storage page in accordance with the invention, this page being usable to store a number of compact discs (CDs) within a thin, flexible, multi-ply page, so as to provide physical and visual access to eight CDs, wherein four CDs are held on each side of the page, or to provide physical and visual access to four CDs and the printed/graphic information that relates to the four CDs, in which case, two CDs and their printed/graphic information are held on each side of the page, the opposite side plan view of the page being a mirror image of FIG. 13.

FIG. 13 is a plan view of another embodiment of a loose leaf, two-sided, CD storage page 10 in accordance with the invention. Storage page 10 of FIG. 13 is again usable to store eight CDs within a thin, flexible, multi-ply three-ring binder page or sheet 10. Page 10 provides physical and visual access to eight CDs that are housed within the four above-described CD storage pockets 220–223 that are located on each side of the page, or page 10 may optionally provide physical and visual access to four CDs and the printed/graphic information that relates to the four CDs, in which case, two CDs and their printed/graphic information are held in the four storage pockets that are on each side of page 10. The opposite side plan view of this embodiment of CD storage page 10 is a mirror image of FIG. 13.

In this embodiment of the invention, the horizontal width 211 of rectangular page 10 was about 11.147265-inches, and the vertical height 212 of page 10 was about 10.25-inches. Page 10 includes a mounting flap 213 that is defined by vertically extending right hand page edge 214 and a vertically extending, six-piece or segment, heat seal fold line 215 that extends generally parallel to page edge 214. Again, fold line 215 comprises the above-mentioned deep heat seal. In this embodiment of the invention, the horizontal width 216 of flap 213 was about 1.585-inch.

Page 10 includes a horizontally extending upper page edge 233, and a horizontally extending lower page edge 234 that is parallel to page edge 233. As will be apparent, page edges 233,234 are defined by two horizontally extending and parallel heat seal lines 634,635, respectively. In this embodiment of the invention, the page's vertically extending left hand edge 235 extends generally parallel to both deep fold line 215 and right hand page edge 214, and page edge 235 was not heat sealed by a vertical heat seal line.

Each flat and generally planar side of page 10 includes four one-CD storage pockets 220, 221, 222, and 223 that are arranged in a square matrix comprising two horizontal pocket rows 220,222 and 221,223, and two vertical pocket columns 220,221 and 222,223. All four CD storage pockets 220–223 have a square shape, about 4.7355-inch on each side, as measured mid-seal to mid-seal, for holding one CD. As will be apparent, the bounds of CD storage pockets 220–223 are defined by multi-function heat seal lines that are used to seal the multiple plies or sheets 50,51,52 (see FIG. 2) of page 10 together.

In this embodiment of the invention, the horizontal spacing that exists between the two upper CD storage pockets 222 and 220, and the horizontal spacing that exists between the two lower CD storage pockets 221,223 is very small, and is defined by a three-piece, vertically extending and aligned, heat seal line 247,248,249.

The spaces, or gaps, 250,251 that exist in heat seal line 247,248,249 allow horizontal movement to the right of the two CDs that are stored in storage pockets 220,221, respectively, and in fact, it is possible that the adjacent circumferential edges of the CDs that are stored in storage pockets 220,222 and 221,223 may physically engage as a result of gaps 250,251. The extent of such horizontal movement of the CDs within storage pockets 220,221 can be controlled by varying the vertical length or size of gaps 250,251. If desired, and by the use of this technique, physical engagement of the adjacent edges of the two CDs within outer storage pockets 220,222 with the edges of the two CDs within inner storage pockets 221,223 can be prevented.

Each of the four CD pockets 220–223 that exist on each side of page 10 includes a centrally disposed and circular finger opening 230 that is about 1-inch in diameter. The left hand side of each finger opening 230 is formed to have a tear-drop shaped extension 231 having two vertically opposed sides that are each formed about a 0.5-inch radius. The left hand side of each of the four tear-drop extensions 231 terminates at a thin, horizontally extending slot 232 that is about 0.25-inch in vertical height. Preferably, slots 232 extend parallel to horizontal page edges 233,234.

As stated, the unique configuration of finger hole 230 and slot 232 provide access to a CD in a storage pocket, while at the same time preventing CDs on one page from being scratched by CDs on an adjacent page, thus minimizing the likelihood of CD damage due to scratching and the like.

In this embodiment, finger opening 230, tear-drop shaped extension 231, and horizontal slot 232 can also be replaced by slot 1000 of FIG. 1B having a vertical height 1001 generally equal to, but not exceeding, 0.50-inch.

The right hand binder portion of page 10 includes three circular through-holes 36,37,38 that are each about 0.1875-inch in diameter. Circular holes 36–38 lie on a common vertical axis 239 that extends generally parallel to page edge 214, and is offset a distance 240 from page edge 214. In this embodiment of the invention, distance 240 was about 1.03125-inches. The three circular binder holes 36–38 are generally centered on the vertical height of page 10, and in this embodiment of the invention, holes 36 and 38 were offset a distance of about 0.844-inch inward from the page's upper and lower edges 233,234, respectively. In this embodiment of the invention, central hole 37 was spaced a distance of about 4.250 to about 4.281-inch from each of the two holes 36 and 38.

The right hand portion of page 10 also includes three horizontally extending and elongated through-holes 41,42, 43. The three elongated holes or slots 41–43 are each about 0.1875-inch in vertical height, and are each about 0.875-inch in horizontal length as measured from center-to-center of the two end semicircle portions of slots 41–43. The two horizontal ends of each elongated hole 41–43 preferably terminate at a semicircle or radius surface; for example, a circle having a radius of about 0.09275-inch. As can be seen from FIG. 13, each of the three elongated holes 41–43 is in horizontal alignment with an individual one of the three circular holes 36–38. Elongated holes 41–43 are also vertically aligned so that each of the holes 41–43 is equally horizontally spaced from circular holes 36–38, and from the page's right hand edge 214.

A feature of the invention provides that elongated holes 41–43 are positioned so that the center of the semicircle, or radius that is located at the left hand end of each hole 41–43, is located a distance that is about 0.625-inch to the left of fold line 215.

A feature of the embodiment of the invention, shown in FIG. 13, eliminates CD-movement-cuts 302,303 that are shown in FIG. 4, and substitutes therefor a pair of elongated and vertically aligned through slots 390,391 that extend through page 10. Through slots 390,391 are vertically aligned on fold line 15. In this embodiment of the invention, both of the slots 390,391 had a vertical height 392 of about 1.50-inch, and had a horizontal width 394 of about 0.625-inch. If desired, slots 390,391 can be made vertically smaller in order to reduce the intrusion of a CD through a slot 390,391 As shown, the vertical physical locations of slots 390,391 are vertically centered on storage pockets 222,223, respectively.

Through openings 390,391 operate to accommodate horizontal movement to the right of the two CDs that are stored in pockets 222,223, respectively. Here also the extent of such horizontal movement of the CDs within storage pockets 222,223 can be controlled by varying the vertical size of openings 390,391.

In order to reduce the horizontal width 211 of CD storage page 10 shown in FIG. 13, the line-type heat sealing pattern that is used to bind two outer sheets 50,51 of FIGS. 2, 3 and 4, and one middle sheet 52 of FIGS. 2 and 5 into the unitary CD storage page assembly 10 has been modified.

Again, a deep fold line 15 is formed in page 10 by operation of two vertically extending and parallel deep heat seal lines 601,602 having gaps 603,604,605 formed therein to accommodate the location of elongated through holes 41,42,43. In addition, in this embodiment of the invention, deep heat seal lines 601,602 include two additional gaps 606 and 607 that are formed therein to accommodate the location of the above-mentioned elongated through slots 390,391. As a result, heat seal lines 601,602 are each made up of six vertically aligned segments.

The outer page edges 214,233,234 are each provided with a heat seal line 633,614,634 that is located generally coincident with page edges 214,233,234, respectively.

Square CD storage pockets 220,221 are formed by, and bounded by, linear heat lines 720,247,248,723 and 723,248,249,724, respectively, whereas square CD storage pockets 222,223 are formed by, and bounded by, heat seal lines 720,602,723 and 720,602,724, respectively. In this embodiment of the invention, the vertical spacing 815 of heat seal lines 720,724 from upper page edge 233 and lower page edge 234, respectively, was about 0.25-inch.

Note that in this embodiment of the invention, a reduction in horizontal page size is achieved by virtue of the fact that one of the two vertical fold-producing deep heat seal lines 602 is also used as a vertical pocket boundary of inner pockets 222,223. More specifically, in this embodiment of the invention, the right hand vertical boundary of the two inner square CD storage pockets 222,223 is formed by fold-producing, six-piece, heat seal line 602.

As a feature of the invention, the page area that is occupied by flap 213 of page 10 may be provided with a heat seal pattern; for example, a pattern of dots or a cross hatch pattern 650 of FIG. 6, in order to secure the three page members 50,52,51 of FIG. 2 together in a selected portion of, or in the entire area of, flap 13. In addition, it is within the spirit and scope of the invention to use such a heat seal pattern in other non-CD-storage areas of page 10.

It is to be understood that the FIG. 13 embodiment of the invention also utilizes the multiple ply construction and arrangement above described relative to FIG. 2, and may include either a single inner and outer transparent sheet, as described relative to FIG. 3, or an inner/outer sheet construction and arrangement like FIG.4 wherein the two outer sheets are formed from a two member or web assembly.

Figure 14:
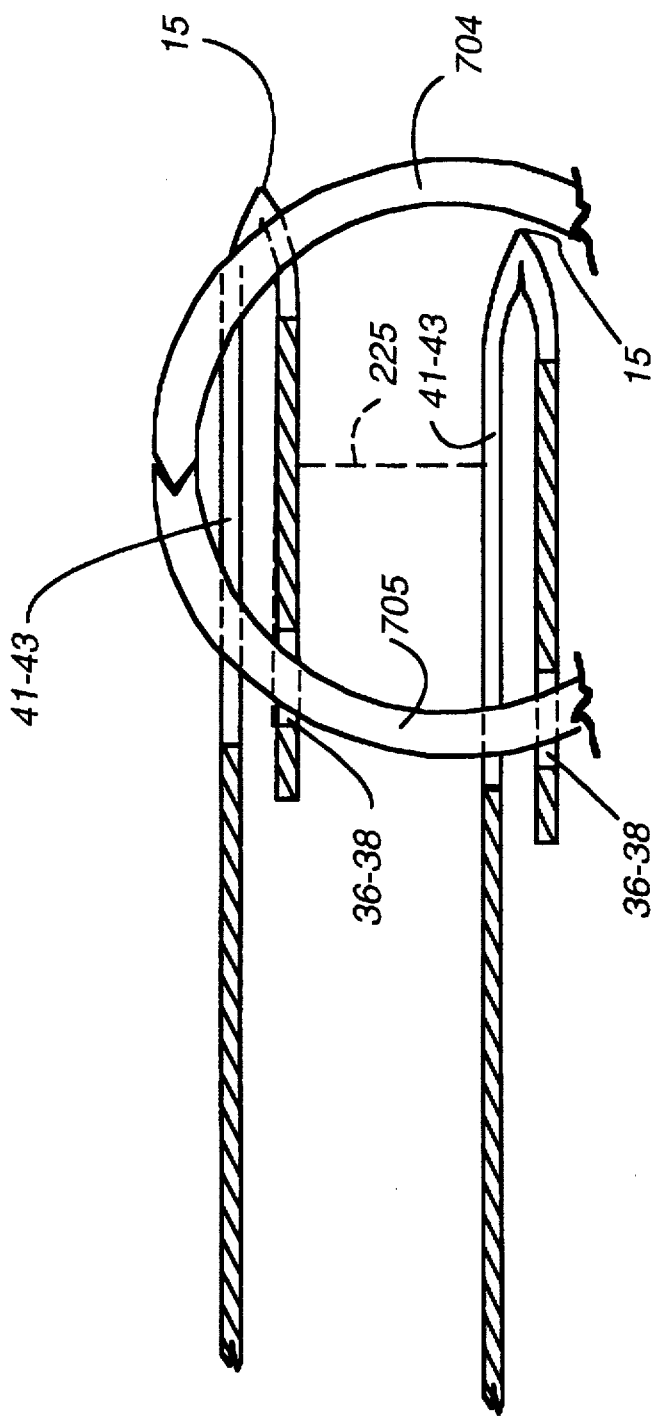
FIG. 14 shows the new and unusual utility of the circular through holes and the elongated through slots that are provided in CD storage pages in accordance with embodiments of the invention, this figure showing how the three folded through slots provide for a noninterfering acceptance of the right hand ring member when a three-ring binder is substantially filled with of a number of CD storage pages in accordance with the invention.

FIG. 14 shows a new and unusual utility of circular through holes 36–38 and elongated through slots 41–43 when a three-ring binder is substantially filled with a number of CD storage pages 10 in accordance with the invention. FIG. 14 is an enlarged edge view that is similar to FIG. 7. In FIG. 14, a stack of a number of CD storage pages 10 pages is designated by broken line 225, only the top and bottom page 10 of which are shown in detail.

Each page 10 within stack 225 is folded on its fold line 15. The upper page, or pages 10, are shown as occupying a narrowing and generally circular area or spacing that is defined by the two mating portions 704,705 of a closed three-ring binder.

All of the pages 10 within stack 225 are secured to the closed three rings by operation of the three circular holes 36–38, and the left hand end of the three elongated slots 41–43 that are provided in each page. The folding of the top page, or pages 10 on the fold line 15, has had the effect of providing an open slot or gap 41–43 that is coincident with the page's fold line 15. This open slot 41–43 provides a noninterfering acceptance of right hand ring member 704. It is noted that the lower page, or pages 10 also are provided with an open slot 41–43 that is formed by the folding of elongated slots 41–43 on fold line 15. However, fold line 15 of these lower sheets 10 does not physically hit or interfere with binder member 704 at the wider, and generally circular area or spacing that exists adjacent to the binder edge 703 (see FIG. 8) of the three-ring binder.

Figure 15:
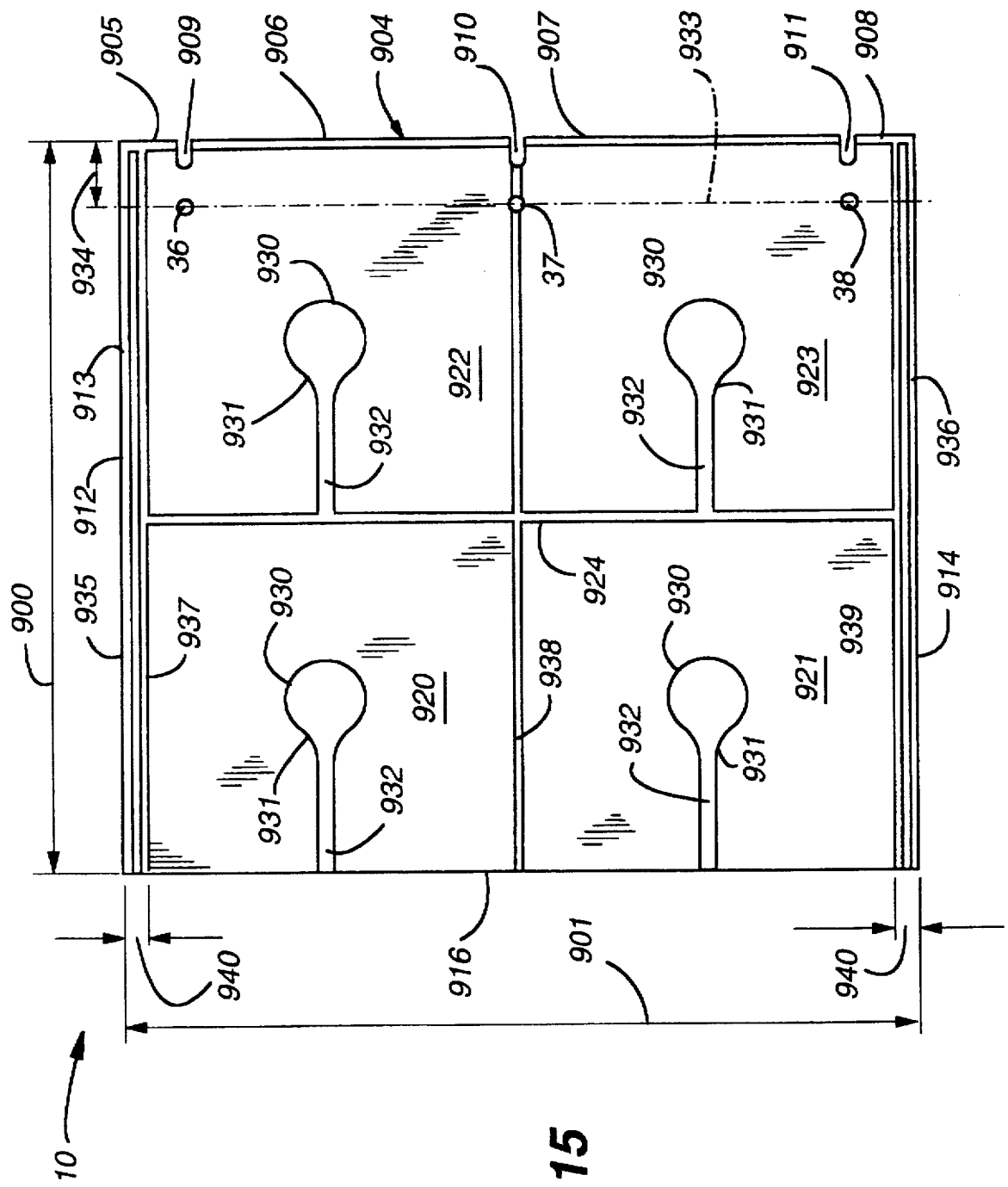
FIG. 15 is a plan view of one nonfolding embodiment of a loose leaf, two-sided, CD storage page in accordance with the invention that is intended for use in thin 1.0-inch binders, as well as in thicker 3.0 or 4.0-inch three-ring binders, this page being usable to store a number of compact discs (CDs) within a thin, flexible, multi-ply page, so as to provide physical and visual access to eight CDs wherein four CDs are held on each side of the page, or to provide physical and visual access to four CDs and the printed/graphic information that relates to the four CDs, in which case, two CDs and their printed/graphic information are held on each side of the page, the opposite side plan view of the page being a mirror image of FIG. 15.

FIG. 15 is a plan view of another embodiment of a loose leaf, two-sided, CD storage page 10 in accordance with the invention, page 10 being usable to store a number of compact discs (CDs) within a thin, flexible, multi-ply page (see FIG. 2) so as to provide physical and visual access to eight CDs, wherein four CDs are held on each side of page 10, or to provide physical and visual access to four CDs and the printed/graphic information that relates to the four CDs, in which case, two CDs and their printed/graphic information are held on each side of page 10, the opposite side plan view of page 10 being a mirror image of FIG. 15.

In this embodiment of the invention, the horizontal width 900 of rectangular page 10 was about 9.625-inches, and the vertical height 901 of page 10 was about 10.25-inches. Page 10 of this embodiment of the invention does not include a foldable mounting flap at its vertically extending right hand page edge 904.

Rather, the vertical binder edge 904 of page 10 is provided with a four-piece linear heat seal 905–908 and with three horizontally extending slots or notches 909–911, each notch of which functions as was described relative to FIG. 14 when a binder page 10 occupies the top of a stack of sheets 225 that substantially fill a three-ring binder.

Page 10 includes a horizontally extending upper page edge 912 that is coincident with a linear heat seal line 913, and horizontally extending lower page edge 914 is coincident with linear heat seal line 915. In this embodiment of the invention, the page's vertically extending left hand edge 916 extends generally parallel to right hand page edge 904, and edge 916 was not heat sealed by a vertical heat seal line.

Each flat and generally planar side of page 10 includes four, one-CD storage pockets 920, 921, 922 and 923 that are arranged in a square matrix comprising two horizontal pocket rows 920,922 and 921,923, and two vertical pocket columns 920,921 and 922,923. All four CD storage pockets 920–923 have a square shape, about 4.7355-inch on each side, for holding one CD in each of the storage pockets. As will be apparent, the bounds of CD storage pockets 920–923 are defined by multi-function heat seal lines that are used to seal the multiple plies or sheets 50,51,52 (see FIG. 2) of page 10 together.

In this embodiment of the invention, the horizontal spacing that exists between the two upper CD storage pockets 920 and 922 and the horizontal spacing that exists between the two lower CD storage pockets 921,923 is very small, and is defined by vertically extending heat seal line 924.

In this embodiment of the invention, there are no spaces, or gaps, in heat seal line 924 that allow horizontal movement to the right of the two CDs that are stored in storage pockets 920,921, respectively.

Each of the four CD pockets 920–923 that exist on each side of page 10 includes a centrally disposed and circular finger opening 930 that is about 1-inch in diameter. The left hand side of each finger opening 930 is formed to have a tear-drop shaped extension 931 having two vertically opposed sides that are each formed about a 0.5-inch radius. The left hand side of each of the four tear-drop extensions 931 terminates at a thin horizontally extending slot 932 that is about 0.25-inch in vertical height. Preferably, slots 932 extend parallel to horizontal page edges 913,914.

As stated, the unique configuration of finger hole and slot provide access to a CD in a storage pocket, while at the same time, minimizing the likelihood of disc damage due to scratching and the like.

As with previous embodiments of the invention, the constructions 930,931,932 can be eliminated, and the generally 0.50-inch high slot 1000 of FIG. 1B can be substituted therefor.

The right hand binder portion of page 10 includes three circular through-holes 36,37,38 that are each about 0.1875-inch in diameter. Circular holes 36–38 lie on a common vertical axis 933 that extends generally parallel to page edge 905–908, and is offset a distance 934 from page edge 905–908. In this embodiment of the invention, distance 934 was about 0.75-inches. The three circular binder holes 36–38 are generally centered on the vertical height of page 10, and in this embodiment of the invention, holes 36 and 38 were offset a distance of about 0.844-inch inward from the page's upper and lower edges 912,914, respectively. In this embodiment of the invention, central hole 37 was spaced a distance of about 4.250 to about 4.281-inch from each of the two holes 36 and 38.

As stated, the right hand portion of page 10 also includes three horizontally extending and elongated through-slots 909–911. The notches, or slots, 909–911 are each about 0.1875-inch in vertical height, and are each about 0.344-inch in horizontal length, which horizontal dimension includes the semicircular right hand end of slots 909,911. The two left hand horizontal ends of each elongated slot 909–911 preferably terminates at a radius surface; for example, a surface having a radius of about 0.09375-inch. As can be seen from FIG. 15, each of the three elongated slots 909–911 is in horizontal alignment with an individual one of the three circular holes 36–38. Elongated slots 909–911 are also vertically aligned so that each of the clots 909–911 is equally horizontally spaced from circular holes 36–38 and from the page's right hand edge 905–908.

An optional feature of the embodiment of the invention shown in FIG. 15 eliminates CD-movement-cuts 302,303 that are shown in FIG. 4, and eliminates the vertically aligned through slots 390,391 that are shown in FIG. 13.

The upper and lower page edges 912,914 are each provided with a heat seal line 935,936 that is located generally coincident with page edges 912,914, respectively.

Square CD storage pockets 920,921 are formed by, and bounded by, linear heat lines 937,924,938 and 938,924,939, respectively, whereas square CD storage pockets 922,93 are formed by, and bounded by, heat seal lines 937, 905,906,938 and 938,907,908,939, respectively. In this embodiment of the invention, the vertical spacing 940 of heat seal line 937 from upper page edge 912 and the vertical spacing of heat seal line 939 from lower page edge 914, respectively, was about 0.25-inch.

Note that in this embodiment of the invention, a reduction in horizontal page size is achieved by virtue of the fact that the heat sealed vertical binder edge of page 10 also forms a boundary of the inner column of CD storage pockets 922, 923, and open notches/slots 909–911 are provided in the binder edge of page 10, these open slots functioning as was described relative to FIG. 14.

It is to be understood that the FIG. 15 embodiment of the invention also utilizes the multiple ply construction and arrangement above described relative to FIG. 2, and may include either a single inner and outer transparent sheets, as described relative to FIG. 3, or an inner/outer sheet construction and arrangement like FIG.4, wherein the two outer sheets are formed from a two member assembly.

As a feature of the invention, the FIG. 15 embodiment thereof may include the use of truncated vertical heat seal lines, as shown in FIG. 13, so as to provide a gap at the vertical right hand side of each of the outer CD storage pockets 920,921, and/or so as to provide a gap at the vertical right hand side of each of the inner CD storage pockets 922,923. As described previously, the use of these truncated vertical heat seal lines at these locations accommodates horizontal movement to the right of CDs with the CD storage pockets.

Figure 17:
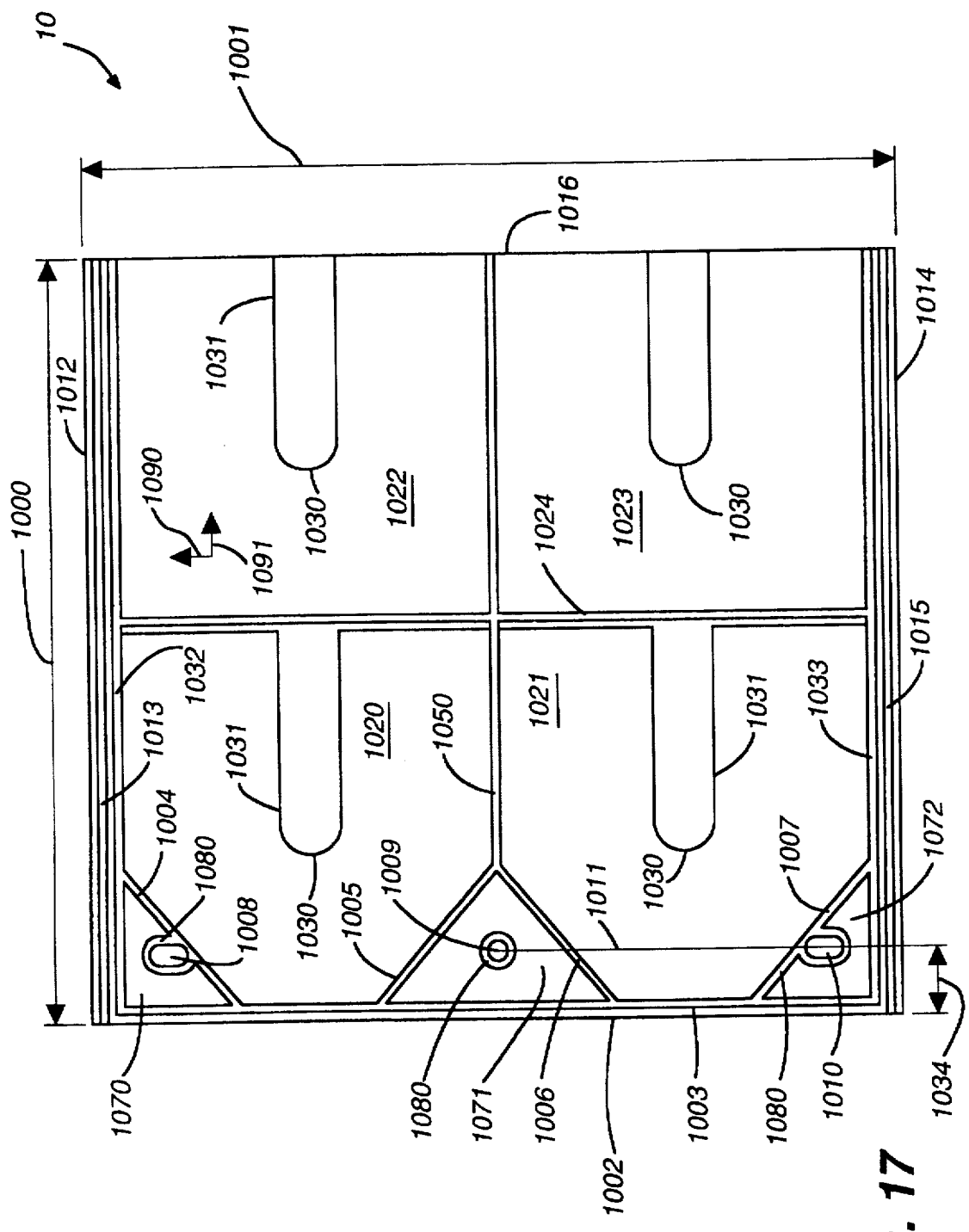
FIG. 17 is a plan view of another nonfolding embodiment of a loose leaf, two-sided, CD storage page in accordance with the invention that is intended for use in thin 1.0-inch binders, as well as in thicker 3.0 or 4.0-inch three-ring binders, this page being usable to store a number of compact discs (CDs) within a thin, flexible, multi-ply page, so as to provide physical and visual access to eight CDs wherein four CDs are held on each side of the page, or to provide physical and visual access to four CDs and the printed/graphic information that relates to the four CDs, in which case, two CDs and their printed/graphic information are held on each side of the page, the opposite side plan view of the page being a mirror image of FIG. 17.

FIG. 17 is a plan view of another embodiment of a loose leaf, two-sided, CD storage page 10 in accordance with the invention. Page 10 is usable to store a number of compact discs (CDs) within a thin, flexible, multi-ply page (for example, as shown in FIG. 2), so as to provide physical and visual access to eight CDs, wherein four CDs are held on each side of page 10, or to provide physical and visual access to four CDs and the printed/graphic information that relates to the four CDs, in which case, two CDs and their printed/graphic information are held on each side of page 10. The opposite side plan view of page 10 is a mirror image of FIG. 17.

In this embodiment of the invention, the horizontal width 1000 of rectangular page 10 was about 9.750-inches, and the vertical height 1001 of page 10 was about 10.25-inches. Page 10 of this embodiment of the invention does not include the foldable mounting flap of FIG. 1B at its vertically extending left hand binder edge 1002, nor does it include a notched binder edge, as is shown in the FIG. 15 embodiment of the invention.

Rather, vertical binder edge 1002 of page 10 is provided with a linear heat seal 1003, and with four 45-degree linear heat seals 1004–1007 that operate to stiffen and to isolate three binder through-holes 1008–1010 that are centered on a vertical axis 1011 spaced about 0.6875-inch from binder edge 1002. In this embodiment of the invention, center binder hole 1009 was about 0.236-inch in diameter, whereas binder holes 1008 and 1010 were elongated in the direction of axis 1011, had a width of about 0.236-inch, and a length of about 0.424-inch. The use of elongated holes 1008 and 1010 accommodates manufacturing variation that is sometimes found in the location of the three binder rings of a standard-utility three-ring binder. Preferably, through-holes 1008–1010 are each closely surrounded and enclosed by an edge disposed heat seal 1080.

Page 10 of FIG. 17 includes a horizontally extending upper page edge 1012 that is generally coincident with a linear heat seal 1013, and a horizontally extending lower page edge 1014 is generally coincident with a linear heat seal 1015. In this embodiment of the invention, the page's vertically extending right hand edge 1016 extends generally parallel to left hand binder edge 1002, and edge 1016 is not heat sealed. The two 45-degree heat seals 1005,1006 join to a linear and horizontally extending heat seal 1050 the operates to horizontally divide page 10 at its mid-portion.

The seven heat seals 1013,1003,1004,1005,1006, 1007, 1015 form three closed page areas 1070,1071 and 1072 generally adjacent to the page's binder edge 1002. Areas 1070 and 1072 each comprise a generally right-triangle whose two sides are each about 1.328-inch long. Area 1071 also comprises a right-triangle area whose page-edge-disposed hypotenuse is about 2.656-inch long. As a feature of the FIG. 17 embodiment of the invention, one or more of the three closed areas 1070–1072 may contain a heat seal pattern that operates to stiffen these three portions of page 10.

In this embodiment of the invention, the vertical spacing of heat seal line 1013 from upper page edge 1012, and the vertical spacing of heat seal line 1015 from lower page edge 1014, respectively, was about 0.063-inch.

Each flat and generally planar side of FIG. 17's page 10 includes four, one-CD storage pockets 1020, 1021, 1022 and 1023 that are arranged in a square matrix comprising two horizontal pocket rows 1020,1022 and 1021,1023, and two vertical pocket columns 1020,1021 and 1022,1023. All four CD storage pockets 1020–1023 define a square-area shape, about 4.85-inch on each side, for holding one CD in each of the four storage pockets. As will be apparent, the bounds of CD storage pockets 1020–1023 are defined by multi-function heat seal lines that are used to seal the multiple plies of page 10 together.

When the nonwoven fabric plies 56,57 of FIG. 2 are used in FIG. 17, plies 56,57 are usually, but not necessarily, oriented so that the fibers within plies 56,57 extend generally in the vertical direction of FIG. 17; i.e., extend generally parallel to page edges 1002,1016, as shown by arrow 1090.

In this FIG. 17 embodiment of the invention, the multiple sheet construction and arrangement 50,51,52 shown in FIG. 2 may be replaced by a single layer of a woven fabric, such as polypropylene, polyethylene, or the like. In a woven material of this type, the fibers therein extend generally perpendicular to each other. Such a single layer of woven fabric is oriented in page 10 so that its orthogonal fibers extend generally parallel to the four edges of page 10, as shown by arrows 1090 and 1091.

The horizontal spacing that exists between the two upper CD storage pockets 1020 and 1022 and the horizontal spacing that exists between the two lower CD storage pockets 1021,1023 is very small, and is defined by vertically extending and linear heat seal 1024. Heat seal 1024 operates to vertically divide page 10 at its mid-portion.

In this embodiment of the invention, there are no spaces, or gaps, in heat seal line 1024 that allow horizontal movement to the left of the two CDs that are stored in storage pockets 1020,1021, respectively, as was provided at 302 and 303 of FIG. 3.

Each of the four CD pockets 1020–1023 that exist on each side of page 10 includes a centrally-disposed and half-circular finger opening 1030 that is about 0.75-inch in diameter. The right hand side of each finger opening 1030 is formed to have an extension slot 1031 having two vertically extending and parallel opposed sides that are vertically spaced about 0.75-inch. Preferably, slots 1031 extend parallel to horizontal page edges 1012,1014. In an embodiment of the invention, the horizontal length of each of the storage pocket finger openings, including both openings 1030 and extension slots 1031, was about 2.625-inch.

As stated, the unique configuration of finger holes 1030 and mating slots 1031 provide access to a CD that is stored in a storage pocket, while at the same time, minimizing the likelihood of CD damage due to scratching and the like (for example, when a number of loaded CD pages 10 are stacked adjacent to each other within a three-ring binder).

The left hand binder portion of page 10 includes three through-holes 1008,1009,1010. Holes 1008–1010 lie on a common vertical axis 1011 that extends generally parallel to page edges 1002,1016, and holes 1008–1010 are offset a distance 1034 from binder edge 1002. In this embodiment of the invention, distance 1034 was about 0.6875-inch. The binder hole 1009 is generally centered on the vertical height of page 10, and in this embodiment of the invention, the center of vertically elongated holes 1008 and 1010 were offset a distance of about 0.75-inch from the page's upper and lower edges 1012,1014, respectively. In this embodiment of the invention, central hole 1009 was spaced a distance of about 4.250 to about 4.281-inch from each of the two holes 1008 and 1010.

A feature of the invention shown in FIG. 17 eliminates CD-movement-cuts 302,303 that are shown in FIG. 4, and eliminates the vertically aligned through slots 390,391 that are shown in FIG. 13.

In a preferred embodiment of the invention as shown in FIG. 17, the two transparent outer sheets that are included in binder page 10 (i.e., sheets 50 and 51 of FIG. 2) are each formed from one individual sheet, this being the configuration that is shown in FIG. 3. In this embodiment, cuts 60,61 of FIG. 3 define the CD insertion/removal slots of inner/upper pocket 1020 and inner/lower pocket 1021, respectively.

In FIG. 17, the upper and lower page edges 1012,1014 are each provided with a horizontally extending linear heat seal 1013,1015 that is located closely adjacent to (i.e., about 0.063-inch from) page edges 1012,1014, respectively. Upper and lower page edges 1012,1014 may also include linear stitch-type heat seals 1032,1033 that are spaced closely adjacent to (i.e., about 0.0625-inch from) heat seals 1013, 1015, respectively.

Since the two heat seals that are within heat seal pairs 1013,1032 and 1015,1033 are quite close together, the use of a stitch-type heat seal at 1032 and 1033 reduces the tendency of page 10 to buckle in the vicinity of page edges 1012 and 1014. This construction and arrangement using these two heat seal pairs 1013,1032 and 1015,1033 is of particular utility when the soft middle sheet of binder page 10 comprises the three-ply construction shown in FIG. 2, and more specifically, when the fibers within sheet 55 of FIG. 2 extend in the direction of FIG. 17's arrow 1090. However, when the soft middle sheet of binder page 10 comprises one ply of a soft woven material whose fibers extend as shown by arrows 1090 and 1091, then stitch-type heal seals 1032 and 1033 can be replaced by a generally continuous heat seal.

When the middle sheet of binder page 10 comprises a single sheet of a soft woven material, such as polypropylene, polyethylene, or the like, the two stitch-type heal seal lines 1032,1033 are located so as to substantially coincide with the upper and lower terminations, respectively, of FIG. 3's cuts 60,61. In this way, binder page 10 is strengthened at upper termination, or end of cut 60 and the lower termination or end of cut 61.

The three orthogonal sides of square CD storage pocket 1020 are formed and bounded by linear heat lines 1032, 1004,1003,1005 and 1050. The three sides of square CD storage pocket 1021 are formed and bounded by linear heat lines 1050,1006,1003,1007 and 1033. The three sides of square CD storage pocket 1022 are formed and bounded by linear heat lines 1032,1024 and 1050. The three sides of square CD storage pocket 1023 are formed and bounded by linear heat lines 1050,1024 and 1033.

Note that in the FIG. 17 embodiment of the invention, a reduction in horizontal page size is achieved by virtue of the fact that the heat sealed and vertically extending binder edge 1002 of page 10 also forms a boundary for the inner column of CD storage pockets 1022,1021.

It is to be understood that the FIG. 17 embodiment of the invention may also utilize the multiple ply construction and arrangement above described relative to FIG. 2, and may include either single outer transparent sheets, as described relative to FIG. 3, or an outer sheet construction and arrangement like FIG.4 wherein the two outer sheets are formed from a two member assembly.

Figure 18:
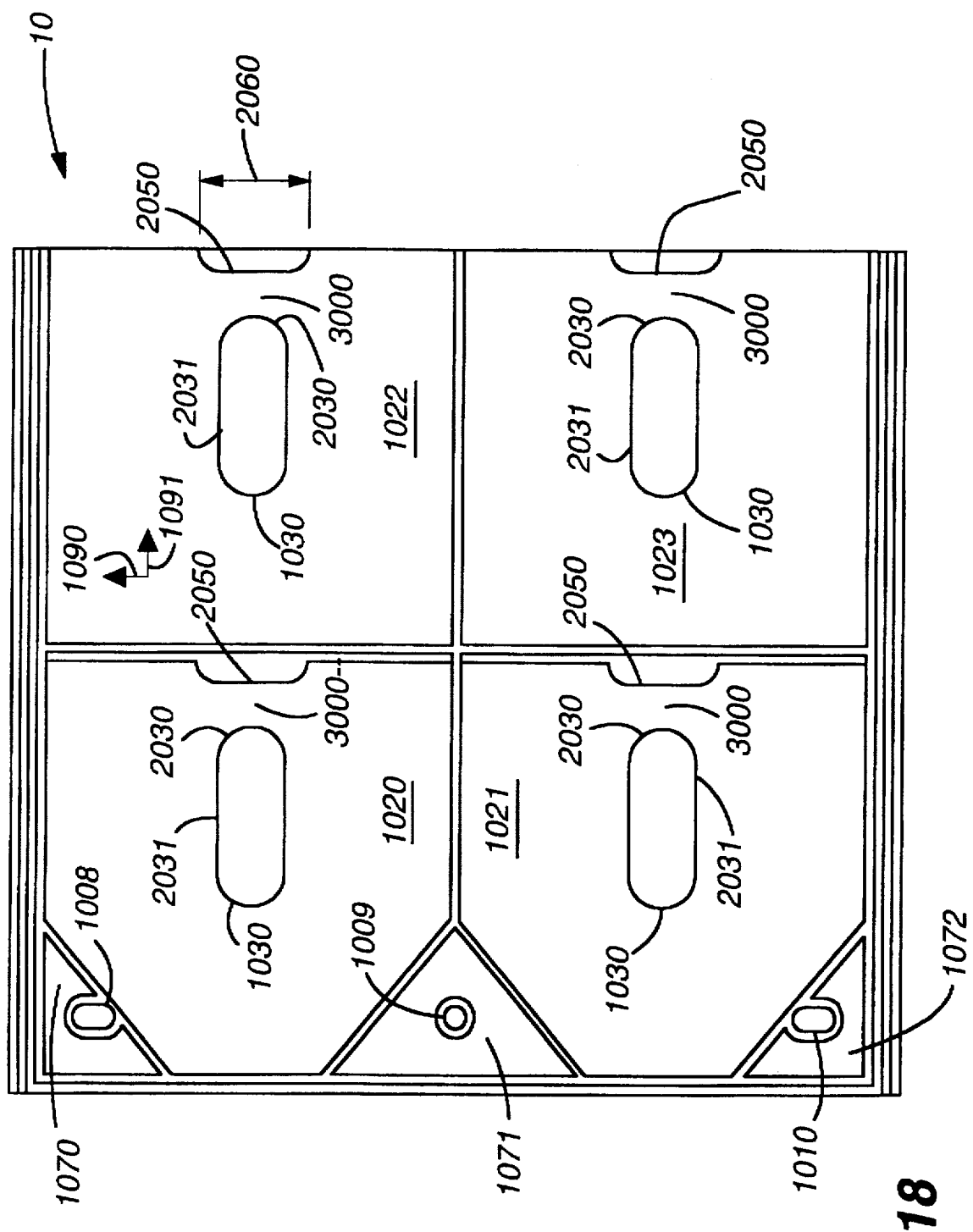
FIG. 18 is a plan view of another nonfolding embodiment of a loose leaf, two-sided, CD storage page in accordance with the invention, this embodiment being generally similar to the embodiment of FIG. 17, but having modified CD insertion openings from that shown in FIG. 17.

FIG. 18 is a plan view of another embodiment of a loose leaf, two-sided, CD storage page 10 in accordance with the invention, this embodiment having many features in common with the FIG. 17 embodiment. Page 10 of FIG. 18 is usable to store a number of compact discs (CDs) within a thin, flexible, multi-ply page (for example, as shown in FIG. 2), so as to provide physical and visual access to eight CDs, wherein four CDs are held on each side of page 10, or to provide physical and visual access to four CDs and the printed/graphic information that relates to the four CDs, in which case, two CDs and their printed/graphic information are held on each side of page 10. The opposite side plan view of page 10 is a mirror image of FIG. 18.

In the FIG. 18 embodiment of the invention, the various dimensions are generally the same as above stated for the FIG. 17 embodiment of the invention. Binder page 10 of FIG. 18 is provided with the heat seals as above stated relative to the FIG. 17 embodiment of the invention. Page 10 of FIG. 18 also includes the three above-mentioned binder through-holes 1008–1010, and the three closed page areas 1070,1071 and 1072 that are located generally adjacent to the binder edge of page 10.

Each flat and generally planar side of FIG. 18's page 10 includes four, single-CD storage pockets 1020, 1021, 1022 and 1023 that are arranged in a square matrix comprising two horizontal pocket rows 1020,1022 and 1021,1023, and two vertical pocket columns 1020,1021 and 1022,1023. All four CD storage pockets 1020–1023 define a square-area shape, about 4.85-inch on each side, for holding one disk-shaped CD in each of the four storage pockets. As with the FIG. 17 embodiment, in FIG. 18 the bounds of CD storage pockets 1020–1023 are defined by multi-function horizontal and vertical heat seals that are used to seal the multiple plies of page 10 together.

When the nonwoven fabric plies 56,57 of FIG. 2 are used in FIG. 18, plies 56,57 are usually, but not necessarily, oriented so that the fibers within plies 56,57 extend generally in the vertical direction of FIG. 18, as shown by arrow 1090.

In this FIG. 18 embodiment of the invention, the multiple sheet construction and arrangement 50,51,52 shown in FIG. 2 may be replaced by a single middle layer of a fiber material or fabric, such as polypropylene, polyethylene, or the like. In a woven material of this type, the fibers therein extend generally perpendicular to each other. Such a single layer of woven fabric is oriented in page 10 so that its orthogonal fibers extend generally parallel to the four edges of page 10, as shown by arrows 1090 and 1091.

The horizontal spacing that exists between the two upper CD storage pockets 1020 and 1022 and the horizontal spacing that exists between the two lower CD storage pockets 1021,1023 is very small, and is defined by a vertically extending and linear heat seal as described relative to FIG. 17. This vertical heat seal operates to vertically divide page 10 at its mid-portion.

As was described relative to FIG. 17, each of the four CD pockets 1020–1023 that exist on each side of FIG. 18's page 10 includes a centrally-disposed and half-circular finger opening 1030 that is about 0.75-inch in diameter.

In the FIG. 18 embodiment, however, the right hand side of each finger opening 1030 mates with a short, horizontally extending, extension slot 2031 having two horizontally extending and parallel sides that are vertically spaced about 0.75-inch. Preferably, the upper and lower sides of extension slots 2031 extend parallel to the upper and lower horizontal edges of page 10.

The two parallel and sides of each of the extension slots 2031 terminate at a half-circular portion 2030 that faces in the opposite direction to half-circular finger opening 1030. Half-circular portions 2030 are also about 0.75-inch in diameter.

In the FIG. 18 embodiment of the invention, the total horizontal length of each of the storage pocket finger openings 1030,2031,2030 was about 1.20-inch.

In addition, each of the four storage pockets 1020–1023 that are on each side of FIG. 18's binder page 10 includes a vertically extending, edge-disposed, finger slot or scallop opening 2050 that is cut from the two outer transparent sheets that comprise page 10 (see sheets 50 and 51 of FIG. 2). As shown, each of the four scallop openings 2050 per page side are generally horizontally centered on a respective storage pocket finger opening 1030,2031,2030. In an embodiment of the invention, the vertical dimension 2060 of each scallop opening 2050 was about 1.0-inch, and each scallop opening 2050 terminated at an end quarter-circle portion having a radius of about 0.25-inch.

A feature of this FIG. 18 embodiment of the invention is that the four CD storage pocket portions that are within each of the two outer plastic sheets of CD storage page 10 (see sheets 50 and 51 of FIG. 2) each include a web portion 3000 that operates to stiffen the outer sheet adjacent to each of the four CD insertion/removal openings. This construction and arrangement operates to prevent curling of the outer sheets as a result of a period of extended use.

In use, a user first inserts a finger into opening portion 1030, and into the center aperture of a CD that is stored in one of the CD storage pockets 1020–1023. This physical engagement with the stored CD enables the user to move the CD to the right, so that the CD's peripheral edge extends out of the pocket's scallop opening 2050. The user then removes the CD from its storage pocket. When replacing the CD, the user merely inserts the CD into the storage pocket by the use of scallop opening 2050.

This unique configuration provides access to a CD that is stored in a storage pocket, while at the same time, minimizing the likelihood of CD damage due to scratching and the like (for example, when a number of loaded CD pages 10 are stacked adjacent to each other within a three-ring binder).

The FIG. 18 embodiment of the invention may also utilize the multiple ply construction and arrangement above described relative to FIG. 2, and may include either single outer transparent sheets, as described relative to FIG. 3, or an outer sheet construction and arrangement like FIG. 4, wherein the two outer sheets are each formed from a two member assembly.

While this invention has been described in detail while making reference to preferred embodiments thereof, it is recognized that those skilled in the art, upon learning of this invention, will readily visualize yet other embodiments that are within the spirit and scope of this invention. Thus, this detailed description is not to be taken as a limitation on the spirit and scope of this invention.

What is claimed is:

1. A three-ring binder page providing four substantially square CD storage pockets on each side of said binder page for storing circular CDs that have equal planar areas and equal diameters, said binder page being constructed and arranged for use within three-ring binders having a standard and general utility size format, said binder page comprising:

a first planar and flexible plastic sheet, a second planar and flexible plastic sheet, and a third planar and flexible plastic sheet;

said first, second and third sheets being arranged in that order;

said first, second and third sheets each having a generally similar rectangular shape;

said first, second and third sheets each having a horizontal top edge and a horizontal bottom edge, a first vertical side edge, and a second vertical binder-side edge;

a first horizontally extending and generally continuous linear heat seal binding said first sheet, second and third sheets together generally at said top edge;

a first stitch-type, horizontally extending, and linear heat seal binding said first, second and third sheets together generally at a location closely adjacent to said first horizontal heat seal;

a second horizontally extending and generally continuous linear heat seal binding said first sheet, second and third sheets together generally at said bottom edge;

a second stitch-type, horizontally extending, and linear heat seal binding said first, second and third sheets together at a location closely adjacent to said second horizontal heat seal;

a third horizontally extending and generally continuous linear heat seal binding said first sheet, second and third sheets together at a horizontal mid-portion of said binder page;

a first vertically extending and generally linear heat seal binding said first sheet, second and third sheets together at a vertical mid-portion of said binder page;

a second vertically extending and generally linear heat seal binding said first, second and third sheets together generally at said binder-side edge;

said first and second horizontally extending stitch-type heat seals and said first and second vertically extending heat seals cooperating to define four planar and generally square CD storage pockets on each side of said binder page;

each of said four storage pockets having a planar area whose vertical and horizontal dimensions are generally equal to said CD diameter;

said four storage pockets on each side of said binder page being arranged in a vertical inner-pocket-column that is generally adjacent to said second vertical binder-side edge, and a vertical outer-pocket-column that is generally adjacent to said first vertical side edge;

each of said pocket-columns containing upper and lower vertically aligned storage pockets;

said outer-pocket-column having vertically aligned storage pocket boundaries that are defined by said first vertically extending heat seal;

said inner-pocket-column having vertically aligned storage pocket boundaries that are defined by said second vertically extending heat seal;

two elongated, vertically extending and aligned CD insertion/removal slots for said outer-pocket-column coincident with said first vertical side edge;

two elongated, vertically extending and aligned CD insertion/removal slots for said inner-pocket-column generally coincident with said first vertically extending heat seal;

a pattern of three vertically aligned binder holes formed on a vertical axis that is spaced from said second binder-side edge;

an upper one of said three binder holes being vertically elongated and formed within said upper storage pocket of said inner column of storage pockets and at a location that excludes said diameter of said CD;

a lower one of said three binder holes being vertically elongated and formed within said bottom storage pocket of said inner column of storage pockets and at a location that excludes said diameter of said CD;

a middle one of said three binder holes being generally circular and formed coincident with said third horizontally extending heat seal;

a first generally 45-degree-to-horizontal heat seal joining said first horizontally extending heat seal to said second vertically extending heat seal at a location that excludes said diameter of said CD, so as to form a first closed area that encompasses said upper one of said three binder holes;

a second generally 45-degree-to-horizontal heat seal joining said second horizontally extending heat seal to said second vertically extending heat seal at a location that excludes said diameter of said CD, so as to form a second closed area that encompasses said lower one of said three binder holes; and third and fourth generally 45-degree-to-horizontal heat seals individually joining said third horizontally extending heat seal to said second vertically extending heat seal at locations that exclude said diameter of said CD, so as to form a third closed area that encompasses said middle one of said three binder holes.

2. The three-ring binder page of claim 1 including:

four finger openings located in each of said first and third flexible plastic sheets, said four finger openings being individual located centrally of said four storage pockets on each side of said binder page; and four horizontally extending CD insertion/removal slots located in each of said first and third plastic sheets, said four CD insertion removal slots individually extending from one of said finger openings to a boundary of said four storage pockets on each side of said binder page.

3. The three-ring binder page of claim 2 wherein said second sheet comprises:

an intermediate adhesive layer, and two outer and soft plastic layers.

4. The three-ring binder page of claim 3 wherein said two outer layers comprise nonwoven polypropylene having a weight of about 30 grams per square yard.

5. The three-ring binder page of claim 2 wherein each of said CD insertion removal slots is of a vertical height not exceeding 0.75-inch.

6. The three-ring binder page of claim 2 wherein:
said first and third sheets are transparent polypropylene sheets, and said second sheet is an opaque three-ply sheet having an intermediate adhesive layer, and two outer layers of soft polypropylene.

7. The three-ring binder page of claim 2 including:
heat seal means sealing said first, second and third sheets together within said first, second and third closed areas.

8. The three-ring binder page of claim 2 wherein:
said first and third sheets are transparent polypropylene sheets, and said second sheet is an opaque sheet of woven soft material selected from the group polypropylene and polyethylene.

9. The three-ring binder page of claim 8 including:
heat seal means sealing said first, second and third sheets together within said first, second and third closed areas.

10. A three-ring binder page providing four substantially square CD storage pockets on each side of said binder page for storing circular CDs that have equal planar areas and equal diameters, said binder page being constructed and arranged for use within three-ring binders having a standard and general utility size format, said binder page comprising:

a first generally transparent, planar and flexible plastic sheet;

a second generally transparent, planar and flexible plastic sheet;

a third generally opaque, planar and flexible plastic sheet formed of a woven material having fibers therein that extend generally in two orthogonal directions;

said third sheet being located between said first and second sheets, and said first, second and third sheets each having a generally similar rectangular shape;

said first, second and third sheets each having a horizontal top edge, a horizontal bottom edge, a first vertical side edge, a second vertical binder-side edge, and said fibers within said third sheet extending generally parallel to said top/bottom edges and said side edges;

a first linear, horizontal and continuous heat seal binding said first, second and third sheets together generally at said top edge;

a second linear, horizontal and continuous heat seal binding said first, second and third sheets together generally at said bottom edge;

a third linear, horizontal and continuous heat seal binding said first, second and third sheets together at a horizontal mid-portion;

a first linear, vertical and continuous heat seal binding said first, second and third sheets together at a vertical mid-portion;

a second linear, vertical and continuous heat seal binding said first, second and third sheets together generally at said binder-side edge;

said first, second and third horizontal heat seals cooperating with said first and second vertical heat seals to define four planar and generally square CD storage pockets on each side of said binder page;

each of said four storage pockets having a planar area whose vertical and horizontal dimensions define an area generally accommodating a CD;

said four storage pockets on each side of said binder page being arranged in a vertical two-pocket inner-column having a column-edge that is generally adjacent to said first vertical heat seal, and a vertical two-pocket outer-column having a column-edge that is generally adjacent to said first vertical side edge;

two elongated, vertically extending and aligned disc insertion/removal slots for said outer-column on each side of said binder page, coincident with said column-edge of said outer-column;

two elongated, vertically extending and aligned disc insertion/removal slots for said inner-column on each side of said binder page, generally coincident with said column-edge of said inner-column;

three vertically aligned binder holes formed on a vertical axis that is spaced from said second binder-side edge;

an upper one of said three binder holes being vertically elongated and formed within an upper storage pocket of said inner-column, and at a location that excludes said area for accommodating a CD;

a lower one of said three binder holes being vertically elongated and formed within a bottom storage pocket of said inner-column, and at a location that excludes said area for accommodating a CD;

a middle one of said three binder holes being generally circular and formed coincident with said third horizontal heat seal;

a first angled-to-horizontal heat seal joining said first horizontally extending heat seal to said second vertically extending heat seal, and at a location that excludes said area for accommodating a CD, so as to form a first closed area that encompasses said upper one of said three binder holes;

a second angled-to-horizontal heat seal joining said second horizontally extending heat seal to said second vertically extending heat seal, and at a location that excludes said area for accommodating a CD, so as to form a second closed area that encompasses said lower one of said three binder holes;

third and fourth angled-to-horizontal heat seals individually joining said third horizontally extending heat seal to said second vertically extending heat seal, and at locations that exclude said area for accommodating a CD, so as to form a third closed area that encompasses said middle one of said three binder holes;

four finger openings located in each of said first and second plastic sheets, said four finger openings being individual located centrally of said four storage pockets on each side of said binder page; and four horizontally extending CD insertion/removal slots located in each of said first and second plastic sheets, said four CD insertion removal slots individually extending from one of said finger openings to a said column-edge.

11. The three-ring binder page of claim 10 wherein each of said CD insertion/removal slots is of a vertical height not exceeding 0.75-inch.

12. The three-ring binder page of claim 10 including:
heat seal means sealing said first, second and third sheets together within said first, second and third closed areas.

13. The three-ring binder page of claim 10 wherein:
said first and second sheets are polypropylene sheets, and said third sheet is a soft material selected from the group polypropylene and polyethylene.

14. The three-ring binder page of claim 13 including:
heat seal means sealing said first, second and third sheets together within said first, second and third closed areas.

15. A three-ring binder page providing four substantially square CD storage pockets on each side of said binder page, each of said CD storage pockets for storing one disk-shaped CD, said binder page being constructed and arranged for use within three-ring binders having a standard and general utility size format, said binder page comprising:

a first generally transparent, planar and flexible plastic sheet;

a second generally transparent, planar and flexible plastic sheet;

a third generally opaque, planar and flexible plastic sheet formed of a fiber material;

said third sheet being located between said first and second sheets;

said first, second and third sheets each having a generally similar rectangular shape;

said first, second and third sheets each having a horizontal top edge, a horizontal bottom edge, a first vertical side edge, and a second vertical binder-side edge;

a first horizontal heat seal binding said first, second and third sheets together generally at said top edge;

a second horizontal heat seal binding said first, second and third sheets together generally at said bottom edge;

a third horizontal heat seal binding said first, second and third sheets together at a horizontal mid-portion;

a first vertical heat seal binding said first, second and third sheets together at a vertical mid-portion;

a second vertical heat seal binding said first, second and third sheets together generally at said binder-side edge;

said first, second and third horizontal heat seals cooperating with said first and second vertical heat seals to define four planar and generally square CD storage pockets on each side of said binder page;

each of said four storage pockets having a planar area whose vertical and horizontal dimensions define an area generally accommodating one disk-shaped CD;

said four storage pockets on each side of said binder page being arranged in a vertical two-pocket inner-column having a column-edge that is generally adjacent to said first vertical heat seal, and a vertical two-pocket outer-column having a column-edge that is generally adjacent to said first vertical side edge;

two elongated, vertically extending and aligned CD insertion/removal slots for said outer-column on each side of said binder page, coincident with said column-edge of said outer-column;

two elongated, vertically extending and aligned CD insertion/removal slots for said inner-column on each side of said binder page, generally coincident with said column-edge of said inner-column;

three vertically aligned binder holes formed on a vertical axis that is spaced from said binder-side edge;

an upper one of said three binder holes being vertically elongated and formed within an upper storage pocket of said inner-column, and at a location that excludes said area for accommodating a disk-shaped CD;

a lower one of said three binder holes being vertically elongated and formed within a bottom storage pocket of said inner-column, and at a location that excludes said area for accommodating a disk-shaped CD;

a middle one of said three binder holes being generally circular and formed coincident with said third horizontal heat seal;

a first angled-to-horizontal heat seal joining said first horizontal heat seal to said second vertical heat seal, and at a location that excludes said area for accommodating a CD, so as to form a first closed area that encompasses said upper one of said three binder holes;

a second angled-to-horizontal heat seal joining said second horizontal heat seal to said second vertical heat seal, and at a location that excludes said area for accommodating a CD, so as to form a second closed area that encompasses said lower one of said three binder holes; and third and fourth angled-to-horizontal heat seals individually joining said third horizontal heat seal to said second vertical heat seal, and at locations that exclude said area for accommodating a CD, so as to form a third closed area that encompasses said middle one of said three binder holes;

four horizontally extending finger slots located in each of said first and second plastic sheets, said four finger openings being individual located centrally of said four storage pockets on each side of said binder page, and terminating so as to leave a web portion of said first and second sheets between said termination of said finger slots and said vertically extending CD insertion/removal slots;

four vertically extending scallop openings located in each of said first and third plastic sheets;

two of said scallop openings being located coincident with said two elongated, vertically extending and aligned CD insertion/removal slots for said outer-column; and two of said scallop openings being located coincident with said two elongated, vertically extending and aligned CD insertion/removal openings for said inner-column.

16. The three-ring binder page of claim 15 wherein each of each of said finger slots is of a vertical height about 0.75-inch, wherein each of said finger slots is of a horizontal length about 1.20-inch, wherein each of said scallop openings is of a vertical height about 1.0-inch, and wherein each of said scallop openings is of a horizontal width about 0.25-inch.

17. The three-ring binder page of claim 15 including:

heat seal means sealing said first, second and third sheets together within said first, second and third closed areas.

18. The three-ring binder page of claim 15 wherein:

said first and second sheets are polypropylene, and said third sheet is a soft fiber material selected from the group polypropylene and polyethylene.

19. The three-ring binder page of claim 18 including:

heat seal means sealing said first, second and third sheets together within said first, second and third closed areas.

* * * * *